US012587928B2

(12) United States Patent (10) Patent No.: US 12,587,928 B2

Yamamoto et al. (45) Date of Patent: Mar. 24, 2026

(54) RADIO BROADCAST RECEIVER AND RADIO SOURCE SWITCHING METHOD

(71) Applicant: Panasonic Intellectual Property Management Co., Ltd., Osaka (JP)

(72) Inventors: Masataka Yamamoto, Kanagawa (JP); Yosuke Ishikawa, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 335 days.

(21) Appl. No.: 18/325,711

(22) Filed: May 30, 2023

(65) Prior Publication Data

US 2023/0328615 A1 Oct. 12, 2023

Related U.S. Application Data

(63) Continuation of application No. PCT/JP2021/040185, filed on Oct. 29, 2021.

(30) Foreign Application Priority Data

Feb. 26, 2021 (JP) ................................. 2021-030901

(51) Int. Cl.
   *H04W 36/30* (2009.01)
   *H04W 36/12* (2009.01)

(52) U.S. Cl.
   CPC ......... *H04W 36/30* (2013.01); *H04W 36/125* (2018.08)

(58) Field of Classification Search
   CPC ............................... H04W 36/20; H04L 12/28
   USPC .................................. 370/329, 401, 402, 403
   See application file for complete search history.

(56) References Cited

U.S. PATENT DOCUMENTS

| | | | | |
|---|---|---|---|---|
| 7,551,889 B2 * | 6/2009 | Quelle | ................... | H04H 60/91 455/3.06 |
| 2010/0296673 A1 * | 11/2010 | Estes | ..................... | G11B 20/02 381/119 |
| 2017/0353251 A1 | 12/2017 | Martinez Diez | | |

FOREIGN PATENT DOCUMENTS

| | | |
|---|---|---|
| CN | 107005319 B | 10/2019 |
| EP | 3160065 A1 | 4/2017 |
| EP | 3324561 A1 | 5/2018 |
| JP | 2010258820 A | 11/2010 |
| JP | 2015126360 A | 7/2015 |
| JP | 2017085223 A | 5/2017 |
| JP | 2017108229 A | 6/2017 |

(Continued)

OTHER PUBLICATIONS

Translation of JP 2018125781A, "Radio Broadcast Receiver", Ozaki Daisuke, 1 page, Sep. 6, 2018.*

(Continued)

*Primary Examiner* — Dang T Ton
(74) *Attorney, Agent, or Firm* — Seed Intellectual Property Law Group LLP

(57) ABSTRACT

A radio broadcast receiver comprising: a memory; and a processor that is coupled to the memory, and, when executing a program stored in the memory, performs operations. The operations include: receiving analog quality information indicating a reception quality of an analog radio based on a broadcast radio including a digital radio and the analog radio; and determining switching of a radio source from one of the broadcast radio and an IP radio to the other of the broadcast radio and the IP radio based on the analog quality information indicating the reception quality of the analog radio.

12 Claims, 12 Drawing Sheets

(56)              References Cited

FOREIGN PATENT DOCUMENTS

JP             2018082399 A      5/2018

OTHER PUBLICATIONS

Broadcast Reception Device and Output Control Method, Hamaguchi Tomoya, May 2, 2015. ( Translation of JP 2016144193 A).*
International Search Report, mailed Dec. 28, 2021, for PCT Application No. PCT/JP2021/040185. (5 pages) (with English translation).
Office Action, dated Aug. 4, 2025, for Taiwanese Patent Application No. 111106820. (35 pages)(with English Translation).

* cited by examiner

RADIO BROADCAST RECEIVER AND RADIO SOURCE SWITCHING METHOD

CROSS-REFERENCE TO RELATED APPLICATIONS

This is a continuation of International Application No. PCT/JP2021/040185 filed on Oct. 29, 2021, and claims priority from Japanese Patent Application No. 2021-030901 filed on Feb. 26, 2021, the entire content of which is incorporated herein by reference.

TECHNICAL FIELD

The present disclosure relates to a radio broadcast receiver and a radio source switching method.

BACKGROUND ART

JP2010-258820A describes a broadcast receiver. The broadcast receiver includes a first level determination unit that determines whether a received signal level of a broadcast wave from a currently selected broadcasting station is equal to or higher than a first threshold. The broadcast receiver includes a second level determination unit that determines whether the received signal level of the broadcast wave from the currently selected broadcasting station is equal to or higher than a second threshold. Here, the second threshold<the first threshold. The broadcast receiver includes an IP network connection determination unit that determines whether an IP network can be connected. The broadcast receiver includes a first permission determination unit. The first permission determination unit permits an output of IP type broadcast from the currently selected broadcasting station via the IP network if the determination by the first level determination unit is positive, or if the determination by the first level determination unit is negative, the determination by the second level determination unit is positive, and the determination by the IP network connection determination unit is positive.

JP2017-085223A describes a broadcast receiver. In the broadcast receiver, when a reception level of first standard broadcast is below a predetermined threshold, calculation of a delay time of second standard broadcast from the first standard broadcast and delay processing for audio data of the first standard broadcast are started, so that an output timing of the audio data of the first standard broadcast is synchronized with an output timing of audio data of the second standard broadcast. When there is no alternative station that can be switched from a broadcasting station of the first standard broadcast, a threshold higher than a threshold used when an alternative station is present is used as a predetermined threshold to determine whether the reception level of the first standard broadcast is below the predetermined threshold.

SUMMARY OF INVENTION

An object of the present disclosure is to provide a radio source switching method and a radio broadcast receiver capable of switching a radio source between an IP radio and a broadcast radio with high accuracy.

The present disclosure provides a radio broadcast receiver including: a memory; and a processor that is coupled to the memory, and, when executing a program stored in the memory, performs operations including: receiving analog quality information indicating a reception quality of an analog radio based on a broadcast radio including a digital radio and the analog radio; and determining switching of a radio source from one of the broadcast radio and an IP radio to the other of the broadcast radio and the IP radio based on the analog quality information indicating the reception quality of the analog radio.

The present disclosure provides a radio source switching method including: receiving analog quality information indicating a reception quality of an analog radio based on a broadcast radio including a digital radio and the analog radio; and determining switching of a radio source from one of the broadcast radio and an IP radio to the other of the broadcast radio and the IP radio based on the analog quality information indicating the reception quality of the analog radio.

According to the present disclosure, a radio source switching method and a radio broadcast receiver capable of switching a radio source between an IP radio and a broadcast radio with high accuracy can be provided.

BRIEF DESCRIPTION OF DRAWINGS

The present disclosure will be described in detail based on the following figures, wherein.

DESCRIPTION OF EMBODIMENTS (Introduction to the Present Disclosure)

A radio broadcast receiver switches which of an IP radio and a broadcast radio a user listens to according to a reception quality of the broadcast radio. That is, the radio broadcast receiver switches a radio source according to the reception quality of the broadcast radio. In the related art, a radio broadcast receiver determines a reception quality of a broadcast radio based on a reception state of radio waves received via an antenna and a tuner when switching a radio source.

For example, in SPS, which means a supplemental program service of IBOC broadcasting, a reception quality can only be determined based on two values indicating whether a signal of SPS can be received as a criterion for switching a radio source. Since there is a time lag of several seconds to determine a reception condition of a signal, in the related art, the radio broadcast receiver cannot determine the reception condition with high accuracy. The accuracy of the reception condition described here is the resolution of a measured value and an accuracy of time delay and the like.

Also in a case of a radio broadcast receiver that receives a broadcast radio including FM and DAB which means digital audio broadcast, the radio broadcast receiver cannot determine a reception condition with high accuracy when switching a radio source.

Therefore, in the following embodiment, examples of a radio source switching method and a radio broadcast receiver that determine whether to switch between an IP radio and a broadcast radio in consideration of a reception state of an analog radio in addition to a reception state of a digital radio will be described.

Hereinafter, the embodiments specifically disclosing the radio broadcast receiver and the radio source switching method according to the present disclosure will be described in detail with reference to the drawings as appropriate. However, unnecessarily detailed descriptions may be omitted. For example, a detailed description of a well-known matter or repeated descriptions of substantially the same configuration may be omitted. This is to avoid unnecessary redundancy in the following description and to facilitate understanding for those skilled in the art. The accompanying drawings and the following description are provided for a thorough understanding of the present disclosure for those skilled in the art, and are not intended to limit the subject matter in the claims.

Figure 1:
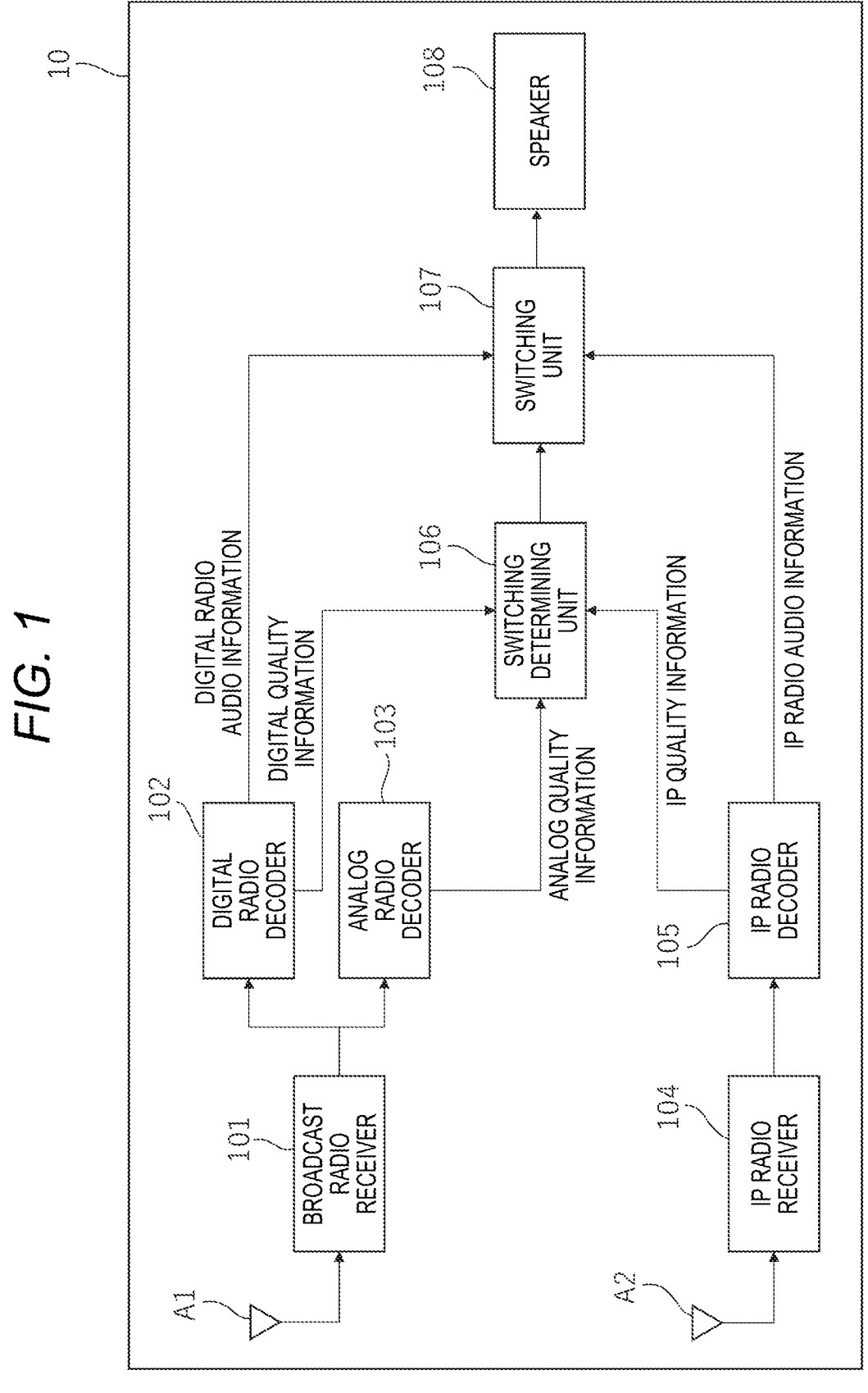
FIG. 1 is a block diagram showing a configuration example of a radio broadcast receiver according to an embodiment of the present disclosure.

FIG. 1 is a block diagram showing a configuration example of a radio broadcast receiver 10 according to an embodiment of the present disclosure. The radio broadcast receiver 10 can receive a broadcast radio and an IP radio. The broadcast radio includes a digital radio and an analog radio. In the present embodiment, an example in which the digital radio is HD SPS will be described. HD SPS means a supplemental program service of hybrid a digital radio. An English notation for HD SPS is a hybrid digital supplemental program service.

The radio broadcast receiver 10 includes a broadcast radio receiver 101, a digital radio decoder 102, and an analog radio decoder 103. The radio broadcast receiver 10 further includes an IP radio receiver 104 and an IP radio decoder 105. The radio broadcast receiver 10 further includes a switching determining unit 106, a switching unit 107, and a speaker 108.

The broadcast radio receiver 101 is connected to an antenna A1 and receives a radio wave of the broadcast radio. The antenna A1 serves as an example of a first antenna. The digital radio decoder 102 decodes a signal included in the radio wave received by the antenna A1 and transmits digital radio audio information after decoding to the switching unit 107. The digital radio decoder 102 transmits digital quality information indicating a reception quality of the digital radio to the switching determining unit 106. The digital quality information is, for example, information indicating success or failure of decoding of the digital radio. The analog radio decoder 103 decodes a signal included in the radio wave received by the antenna A1 and transmits analog quality information indicating a reception quality of the analog radio to the switching determining unit 106. The analog quality information is, for example, a signal level of the analog radio.

The IP radio receiver 104 is connected to an antenna A2 and receives the IP radio. The antenna A2 serves as an example of a second antenna. The IP radio decoder 105 decodes a signal included in a radio wave received by the antenna A2 and transmits IP radio audio information after decoding to the switching unit 107. The IP radio decoder 105 transmits IP quality information indicating a reception quality of the IP radio to the switching determining unit 106. The IP quality information is, for example, information indicating a reception condition of the IP radio. The information indicating the reception condition of the IP radio is, for example, information indicating presence or absence of a sound interruption in the IP radio. The information indicating the reception condition of the IP radio may be, for example, information indicating success or failure of decoding of the IP radio. The information indicating the reception condition of the IP radio may be a combination of two or more pieces of information.

The switching determining unit 106 determines which of the broadcast radio and the IP radio is to be output as a radio source based on at least one of the digital quality information, the analog quality information, and the IP quality information, and transmits information indicating a determination result to the switching unit 107.

The switching unit 107 determines switches the radio source to either the digital radio or the IP radio based on the information indicating the determination result received from the switching determining unit 106. The speaker 108 outputs a digital radio sound or an IP radio sound according to the switching performed by the switching unit 107.

In the embodiment of the present disclosure, the radio broadcast receiver 10 includes a processor and a memory storing a program. When the program is executed by the processor, the functions of the IP radio decoder 105, the switching determining unit 106, and the switching unit 107 are implemented. The program may further implement, when executed by the processor, the function of the digital radio decoder 102. The IP radio decoder 105, the switching determining unit 106, the switching unit 107, and the digital radio decoder 102 may be configured by separated hardware, respectively.

Figure 2:
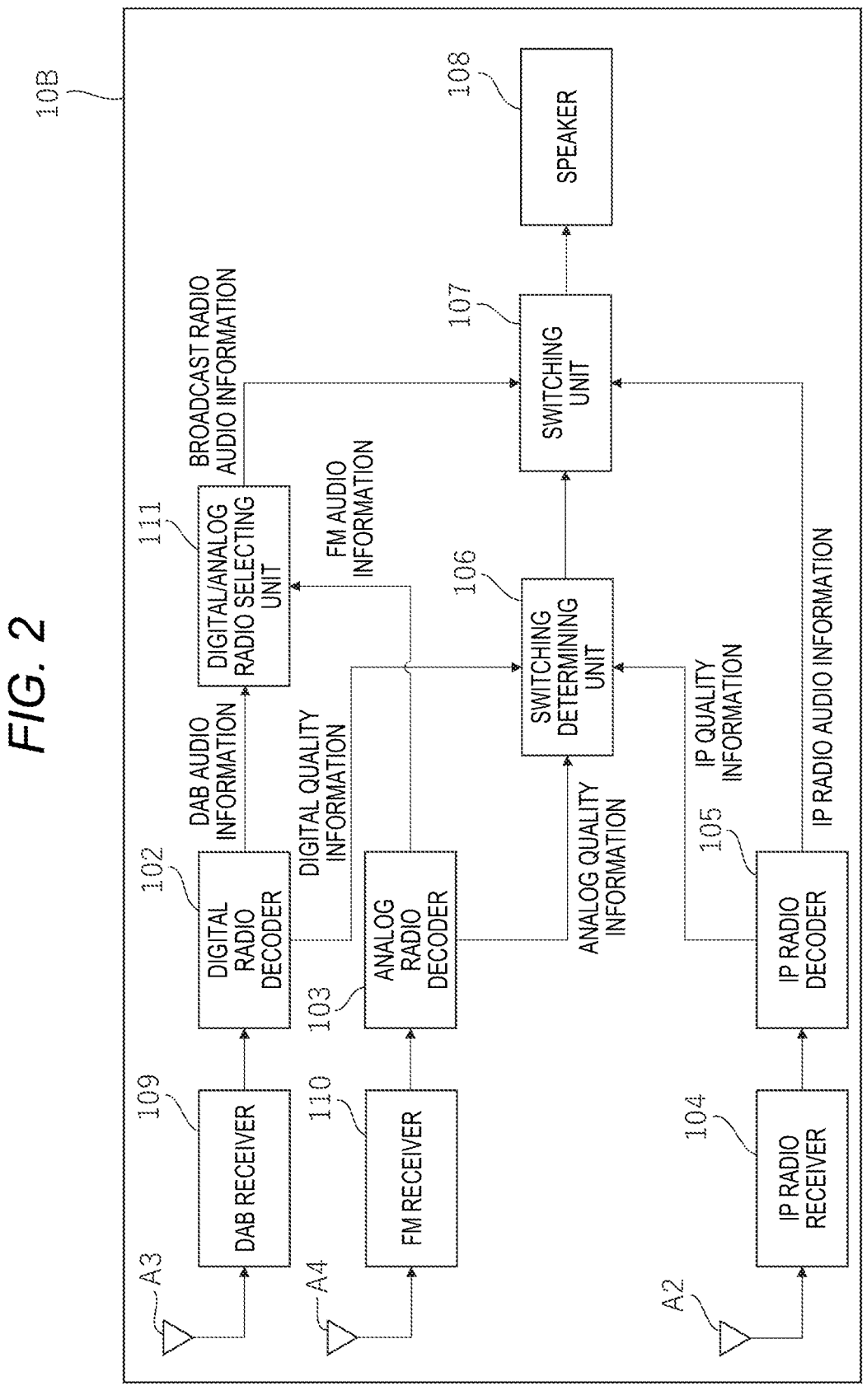
FIG. 2 is a block diagram showing a configuration example of a radio broadcast receiver according to an embodiment of the present disclosure.

FIG. 2 is a block diagram showing a configuration example of a radio broadcast receiver 10B according to an embodiment of the present disclosure. The radio broadcast receiver 10B is another configuration example of the radio broadcast receiver 10. The radio broadcast receiver 10B can receive the broadcast radio and the IP radio. The broadcast radio includes the digital radio and the analog radio. In the present embodiment, an example in which the digital radio is DAB and the analog radio is FM will be described. DAB means digital audio broadcast. An English notation for DAB is the digital audio broadcast.

The radio broadcast receiver 10B includes a DAB receiver 109, the digital radio decoder 102, an FM receiver 110, the analog radio decoder 103, and a digital/analog radio selecting unit 111. The radio broadcast receiver 10B further includes the IP radio receiver 104 and the IP radio decoder 105. The radio broadcast receiver 10B further includes the switching determining unit 106, the switching unit 107, and the speaker 108.

The DAB receiver 109 is connected to an antenna A3 and receives a radio wave of DAB. The antenna A3 serves as an example of at least part of the first antenna. The digital radio decoder 102 decodes a signal included in the radio wave received by the antenna A3 and transmits DAB audio information after decoding to the digital/analog radio selecting unit 111. The digital radio decoder 102 transmits digital quality information to the switching determining unit 106. The digital quality information is, for example, a bit error rate (BER).

The FM receiver 110 is connected to an antenna A4 and receives a radio wave of an analog radio broadcast. The antenna A4 serves as an example of at least part of the first antenna. The analog radio decoder 103 decodes a signal included in the radio wave received by the antenna A4 and transmits FM audio information after decoding to the digital/analog radio selecting unit 111. The analog radio decoder 103 transmits analog quality information to the switching determining unit 106. The analog quality information is, for example, a signal level of the analog radio.

The digital/analog radio selecting unit 111 selects any one of the DAB audio information and the FM audio information based on a predetermined criterion, and transmits the selected audio information to the switching unit 107 as broadcast radio audio information.

The IP radio receiver 104 is connected to the antenna A2 and receives the IP radio. The IP radio decoder 105 decodes a signal included in a radio wave received by the antenna A2 and transmits IP radio audio information after decoding to the switching unit 107. The IP radio decoder 105 transmits IP quality information to the switching determining unit 106.

The switching determining unit 106 determines which of the broadcast radio and the IP radio is to be output as a radio source based on at least one of the digital quality information, the analog quality information, and the IP quality information, and transmits information indicating a determination result to the switching unit 107.

The switching unit 107 determines switches the radio source to either the broadcast radio or the IP radio based on the information indicating the determination result received from switching determining unit 106. The speaker 108 outputs a broadcast radio sound or an IP radio sound according to the switching performed by the switching unit 107.

A mode of radio source switching processing performed by the switching unit 107 shown in FIG. 1 or 2 is not limited to immediate switching. For example, the radio source switching processing performed by the switching unit 107 also includes a mode in which the switching is performed by gradually changing ratios while mixing a first radio source and a second radio source. Here, the immediate switching refers to immediate switching from the first radio source to the second radio source.

Mixing of the first radio source and the second radio source is more specifically described by assuming that the first radio source is the broadcast radio and the second radio source is the IP radio. For example, at a first time point, a ratio of the broadcast radio in an output is 100%. At a second time point, the ratio of the broadcast radio is 70%, and a ratio of the IP radio is 30%. At a third time point, the ratio of the broadcast radio is 30%, and the ratio of the IP radio is 70%. At a fourth time point, the ratio of the IP radio is 100%. The switching unit 107 may switch the radio source while changing the ratios of the first radio source and the second radio source, for example, as described above.

The switching unit 107 may change the above ratios of the first radio source and the second radio source discretely or continuously.

It is assumed in the above that the first radio source is the broadcast radio and the second radio source is the IP radio. However, the first radio source may be the IP radio and the second radio source may be the broadcast radio. Hereinafter, the embodiments of the present disclosure will be described in more detail by using flowcharts, conceptual diagrams, and the like, and also in the following, the switching of the radio source includes not only the immediate switching but also a mode in which the switching is performed by gradually changing the ratios while mixing the first radio source and the second radio source.

In the embodiment of the present disclosure, the program stored in the memory of the radio broadcast receiver 10 may further implement, when executed by the processor, the function of the digital/analog radio selecting unit 111. The IP radio decoder 105, the switching determining unit 106, the switching unit 107, the digital radio decoder 102, and the digital/analog radio selecting unit 111 may be configured by separated hardware, respectively.

Figure 3:
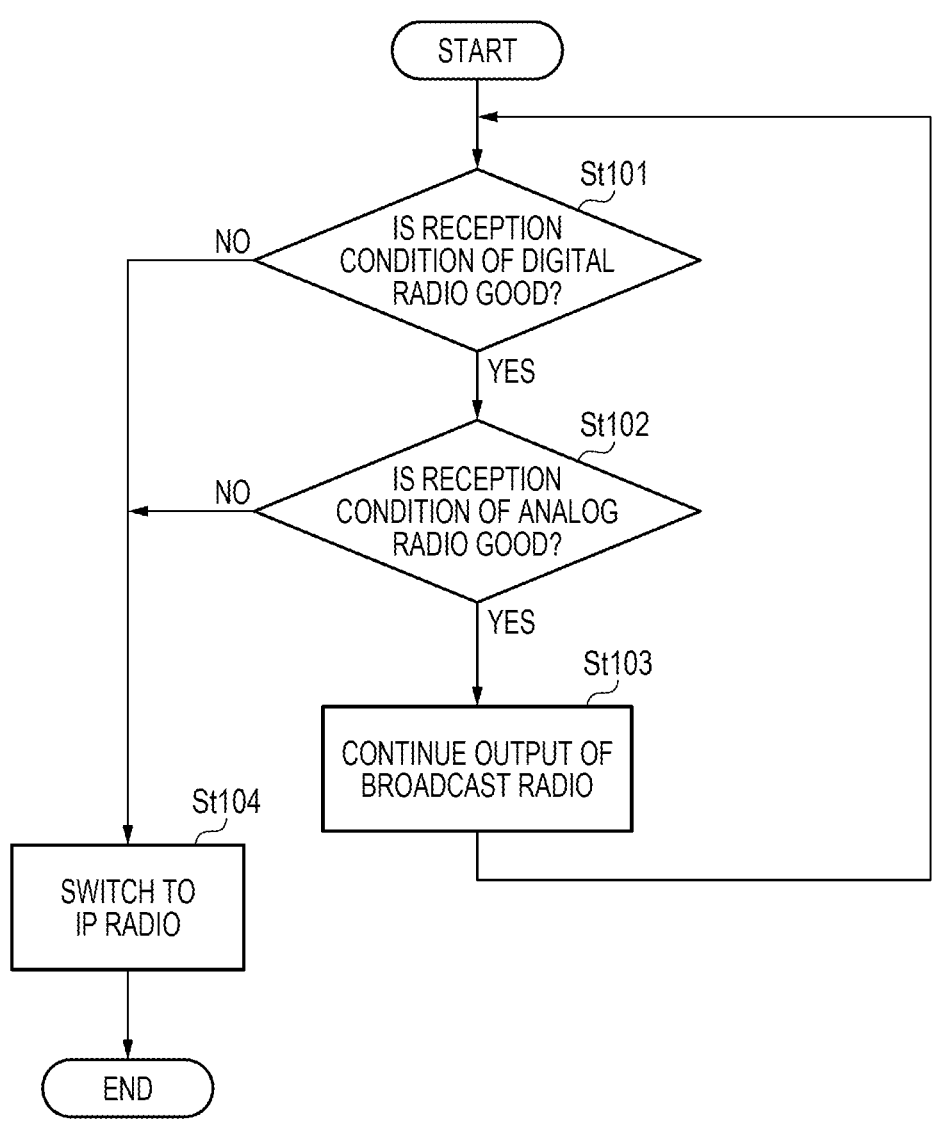
FIG. 3 is a flow chart showing an example of processing when the radio broadcast receiver in FIG. 1 determines to switch a radio source from HD SPS to an IP radio.

FIG. 3 is a flow chart showing an example of processing when the radio broadcast receiver 10 in FIG. 1 determines to switch the radio source from HD SPS to the IP radio.

The switching determining unit 106 determines whether a reception condition of the digital radio is good. The determination is performed based on the digital quality information received from the digital radio decoder 102 by the switching determining unit 106. For example, when the digital quality information is information indicating success or failure of decoding of the digital radio, the switching determining unit 106 determines that the reception condition of the digital radio is good if the digital radio can be decoded, and determines that the reception condition of the digital radio is not good if the digital radio cannot be decoded (St101). If the switching determining unit 106 determines that the reception condition of the digital radio is good, for example, if the digital radio can be decoded (St101: Yes), the processing transitions to step St102. If the switching determining unit 106 determines that the reception condition of the digital radio is not good, for example, if the digital radio cannot be decoded (St101: No), the processing transitions to step St104.

In step St102, the switching determining unit 106 determines whether a reception condition of the analog radio is good. The determination is performed based on the analog quality information received from the analog radio decoder 103. For example, when the analog quality information is the signal level of the analog radio, if a numerical value indicating the signal level of the analog radio continuously falls below a predetermined threshold for a certain period of time, the switching determining unit 106 determines that the reception condition of the analog radio is not good. If the switching determining unit 106 determines that the reception condition of the analog radio is not good (St102: NO), the processing transitions to step St104. If the switching determining unit 106 determines that the reception condition of the analog radio is good (St102: YES), the processing transitions to step St103.

In a situation where the processing is transitioned to step St103, the reception condition of the digital radio is good, and the reception condition of the analog radio is also good. Therefore, the switching determining unit 106 determines that switching to the IP radio is unnecessary, and does not cause the switching unit 107 to switch the radio source. Therefore, the broadcast radio from the speaker 108 continues to be output. Then, the processing returns to step St101.

In step St104, the reception condition of the digital radio is not good, or the reception condition of the analog radio is not good. Therefore, the switching determining unit 106 determines that the output of the broadcast radio cannot be continued, and causes the switching unit 107 to switch the radio source to the IP radio.

Figure 4:
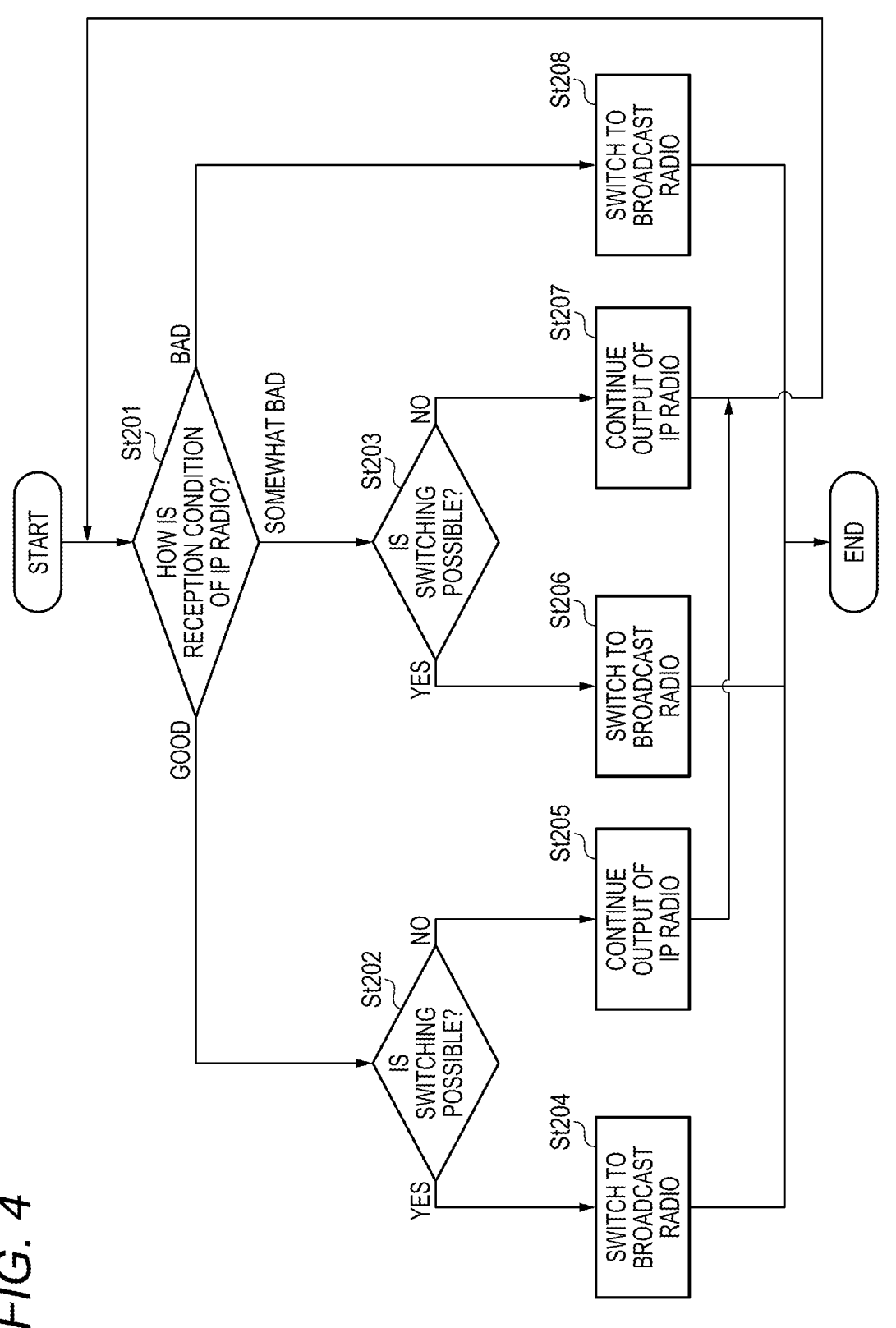
FIG. 4 is a flow chart showing an example of processing when the radio broadcast receiver in FIG. 1 determines to switch the radio source from the IP radio to HD SPS of a broadcast radio.

FIG. 4 is a flow chart showing an example of processing when the radio broadcast receiver 10 in FIG. 1 determines to switch the radio source from the IP radio to HD SPS of the broadcast radio.

The switching determining unit 106 determines the reception condition of the IP radio (St201). The determination is performed based on the IP quality information received from the IP radio decoder 105. If the switching determining unit 106 determines that the reception condition of the IP radio is good (St201: GOOD), the processing transitions to step St202. If the switching determining unit 106 determines that the reception condition of the IP radio is somewhat bad (St201: SOMEWHAT BAD), the processing transitions to step St203. If the switching determining unit 106 determines that the reception condition of the IP radio is bad (St201: BAD), the processing transitions to step St208.

Examples of criteria for determining the reception condition of the IP radio in step St201 are shown. A good reception condition means, for example, a condition where no sound interruption is present in the IP radio. A somewhat bad reception condition means, for example, a condition where some sound interruptions are present in the IP radio, but a user can listen to the IP radio without switching back to the broadcast radio. A bad reception condition means, for example, a condition where the IP radio has not been decoded for a certain period of time or longer. The above criteria for determining are only examples, and those skilled in the art may determine the reception condition of the IP radio by using criteria for determining other than those described above.

In step St202, the switching determining unit 106 determines whether it is possible to switch from the IP radio to the broadcast radio. If the switching determining unit 106 determines that it is possible to switch from the IP radio to the broadcast radio (St202: YES), the processing transitions to step St204. If the switching determining unit 106 determines that it is impossible to switch from the IP radio to the broadcast radio (St202: NO), the processing transitions to step St205.

An example of criteria for determining whether it is possible to switch from the IP radio to the broadcast radio in step St202 is shown. For example, when the decoding of the digital radio is continuously performed for a certain period of time and a numerical value indicating the reception quality of the analog radio exceeds a first threshold α by a first time span, the switching determining unit 106 determines that it is possible to switch from the IP radio to the broadcast radio. The numerical value indicating the reception quality of the analog radio is, for example, a numerical value of the signal level of the analog radio.

In step St203, the switching determining unit 106 determines whether it is possible to switch from the IP radio to the broadcast radio. If the switching determining unit 106 determines that it is possible to switch from the IP radio to the broadcast radio (St203: YES), the processing transitions to step St206. If the switching determining unit 106 determines that it is impossible to switch from the IP radio to the broadcast radio (St203: NO), the processing transitions to step St207.

An example of criteria for determining whether it is possible to switch from the IP radio to the broadcast radio in step St203 is shown. For example, when the decoding of the digital radio is continuously performed for a certain period of time and the numerical value indicating the reception quality of the analog radio exceeds a second threshold β by a second time span, the switching determining unit 106 determines that it is possible to switch from the IP radio to the broadcast radio. The numerical value indicating the reception quality of the analog radio is, for example, a numerical value of the signal level of the analog radio. The second threshold β is, for example, equal to or less than the first threshold α. The second time span may be equal to the first time span or may be shorter than the first time span.

In step St204 and step St206, the switching determining unit 106 determines that switching from the IP radio to the broadcast radio is possible, and causes the switching unit 107 to switch the radio source to the broadcast radio. In step St208, since the reception condition of the IP radio is bad (St201: BAD), the switching determining unit 106 determines that switching from the IP radio to the broadcast radio is required, and causes the switching unit 107 to switch the radio source to the broadcast radio. The audio information output when the radio source is switched to the broadcast radio may be a mixture of analog radio audio information and the digital radio audio information in a certain ratio.

In step St205 and step St207, the switching determining unit 106 determines that switching from the IP radio to the broadcast radio is impossible, and does not cause the switching unit 107 to switch the radio source. Therefore, the IP radio from the speaker 108 continues to be output. Then, the processing returns to step St201.

Figure 5:
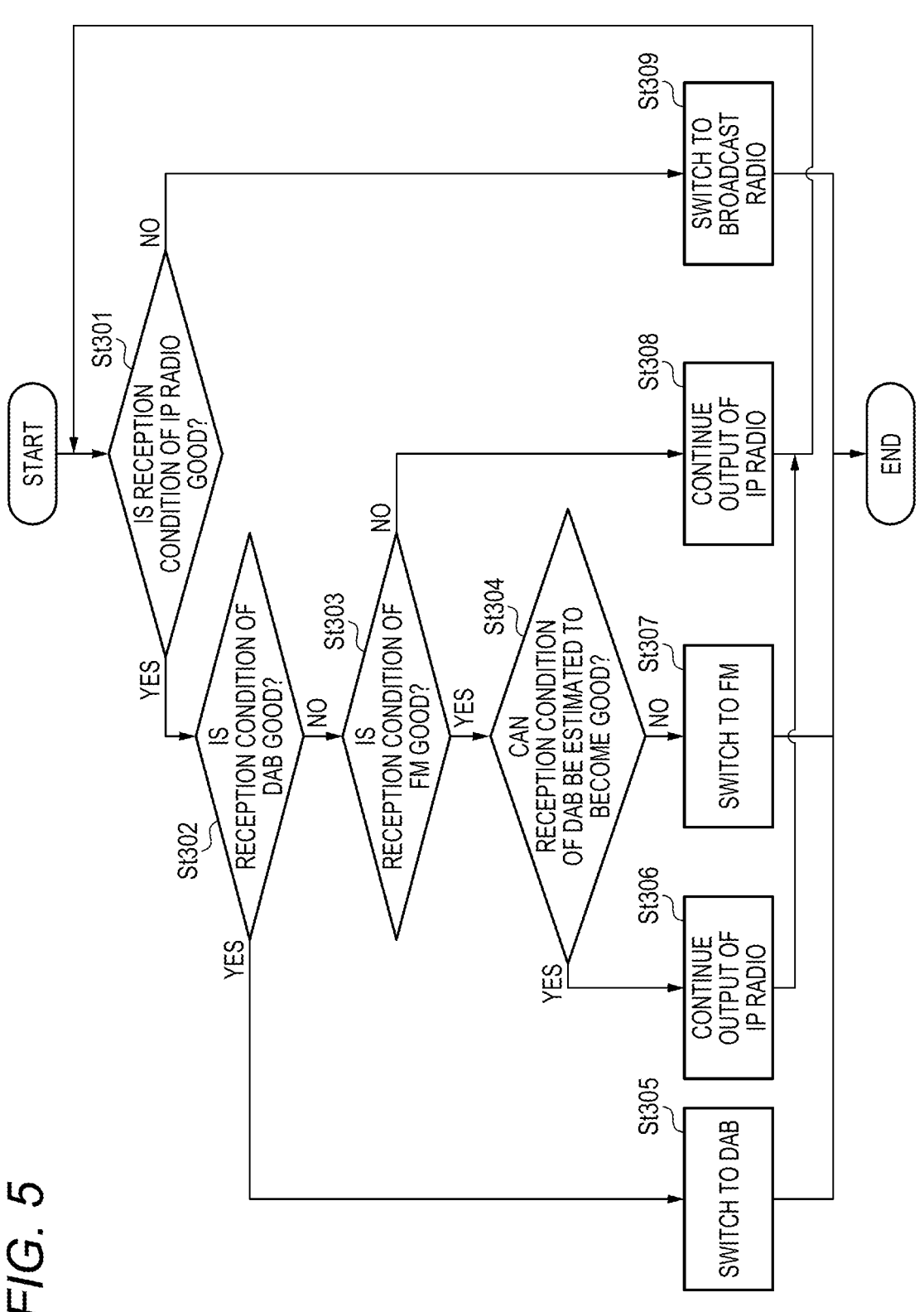
FIG. 5 is a flow chart showing an example of processing when the radio broadcast receiver in FIG. 2 determines to switch the radio source from the IP radio to DAB or FM.

FIG. 5 is a flow chart showing an example of processing when the radio broadcast receiver 10B in FIG. 2 determines to switch the radio source from the IP radio to DAB or FM.

The switching determining unit 106 determines whether the reception condition of the IP radio is good (St301). The determination is performed based on the IP quality information received from the IP radio decoder 105 by the switching determining unit 106. If the switching determining unit 106 determines that the reception condition of the IP radio is good (St301: YES), the processing transitions to step St302. If the switching determining unit 106 determines that the reception condition of the IP radio is not good (St301: NO), the processing transitions to step St309.

Examples of criteria for determining the reception condition of the IP radio in step St301 are shown. A good reception condition of the IP radio means, for example, a condition where no sound interruption is present in the IP radio, or a condition where some sound interruptions are present in the IP radio, but the user can listen to the IP radio without returning to the broadcast radio. A not good reception condition of the IP radio means a condition where the IP radio has not been decoded for a certain period of time or longer. The above criteria for determining are only examples, and those skilled in the art may determine the reception condition of the IP radio by using criteria for determining other than those described above.

In step St301, the switching determining unit 106 determines the reception condition of the IP radio with two choices of "good" and "not good". However, as in step St201 in FIG. 4, the switching determining unit 106 determines the reception condition of the IP radio with three choices of "good", "somewhat bad", and "bad".

In step St302, the switching determining unit 106 determines whether the reception condition of the digital radio is good. The determination is performed based on the digital quality information received from the digital radio decoder 102 by the switching determining unit 106. In the example shown in FIG. 5, since the digital radio is DAB, DAB will be described below as an example. If the switching determining unit 106 determines that a reception condition of DAB is good (St302: YES), the processing transitions to step St305. If the switching determining unit 106 determines that the reception condition of DAB is not good (St302: NO), the processing transitions to step St303.

Examples of criteria for determining the reception condition of DAB by the switching determining unit 106 in step St302 are shown. A case where the reception condition of DAB is good is, for example, a case where a value of a bit error rate is smaller than a predetermined threshold. A case where the reception condition of DAB is not good is, for example, a case where the bit error rate is larger than the predetermined threshold. The above criteria for determining are only examples, and those skilled in the art may determine the reception condition of DAB by using criteria for determining other than those described above.

In step St303, the switching determining unit 106 determines whether the reception condition of the analog radio is good. The determination is performed based on the analog quality information received from the analog radio decoder 103 by the switching determining unit 106. If the switching determining unit 106 determines that a reception condition of FM is good (St303: YES), the processing transitions to step St304. If the switching determining unit 106 determines that the reception condition of FM is not good (St303: NO), the processing transitions to step St308.

Examples of criteria for determining the reception condition of FM by the switching determining unit 106 in step St303 are shown. A case where the reception condition of FM is good is, for example, a case where a signal level of FM is larger than a predetermined value. A case where the reception condition of FM is not good is, for example, a case where the signal level of FM is smaller than the predetermined threshold. The above criteria for determining are only examples, and those skilled in the art may determine the reception condition of FM by using criteria for determining other than those described above.

In step St304, the switching determining unit 106 determines whether the reception condition of DAB can be estimated to become good. If the switching determining unit 106 determines that the reception condition of DAB can be estimated to become good (St304: YES), the processing transitions to step St306. If the switching determining unit 106 determines that the reception condition of DAB cannot be estimated to become good (St304: NO), the processing transitions to step St307. How the switching determining unit 106 specifically determines whether the reception condition of DAB can be estimated to become good will be described later.

In step St305, the switching determining unit 106 determines that switching from the IP radio to DAB is possible, and causes the switching unit 107 to switch the radio source to the broadcast radio. The broadcast radio described here is DAB. In step St305, the reception condition of the IP radio is good, and the reception condition of DAB is also good, and thus the radio source is switched to DAB. This is because packet communication fees are needed for listening to the IP radio, and it is more economical for the user to listen to DAB if DAB is available.

In step St307, the switching determining unit 106 determines that switching from the IP radio to FM is appropriate, and causes the switching unit 107 to switch the radio source to the broadcast radio. The broadcast radio described here is FM. The processing of step St307 is performed if the reception condition s of the IP radio and FM are good, and the reception condition of DAB is not good. When the processing proceeds to step St307, the reception condition of DAB cannot be estimated to become good, and thus the radio source is switched to FM whose reception condition is good.

In step St309, since the reception condition of the IP radio is bad, the switching determining unit 106 determines that it is required to switch from the IP radio to the broadcast radio, and causes the switching unit 107 to switch the radio source to the broadcast radio. The broadcast radio described here is DAB or FM, whichever has a better audio reception quality. The switching determining unit 106 may determine which of DAB and FM has a better audio reception quality based on the digital quality information received from the digital radio decoder 102 and the analog quality information received from the analog radio decoder 103.

In step St306 and step St308, the switching determining unit 106 determines that switching from the IP radio to the broadcast radio is not performed, and does not cause the switching unit 107 to switch the radio source. Therefore, the IP radio from the speaker 108 continues to be output. Then, the processing returns to step St301. The processing of step St306 is performed if the reception condition s of the IP radio and FM are good, and the reception condition of DAB is not good. When the processing proceeds to step St306, the reception condition of DAB can be estimated to become good, and thus the switching determining unit 106 does not cause the switching unit 107 to switch the radio source and continues to output the IP radio in order to wait for the reception condition of DAB to become good. Meanwhile, when the processing proceeds to step St308, the reception condition of DAB can be estimated to become good, and thus the switching determining unit 106 does not cause the switching unit 107 to switch the radio source and continues to output the IP radio.

As a modification of the example of processing shown in FIG. 5, a mode in which step St304 is not provided is also conceivable. In the modification, in step St303, if the switching determining unit 106 determines that the reception condition of FM is good (St303: YES), the processing may directly transition to step St307 to switch the radio source from the IP radio to FM.

Figure 6:
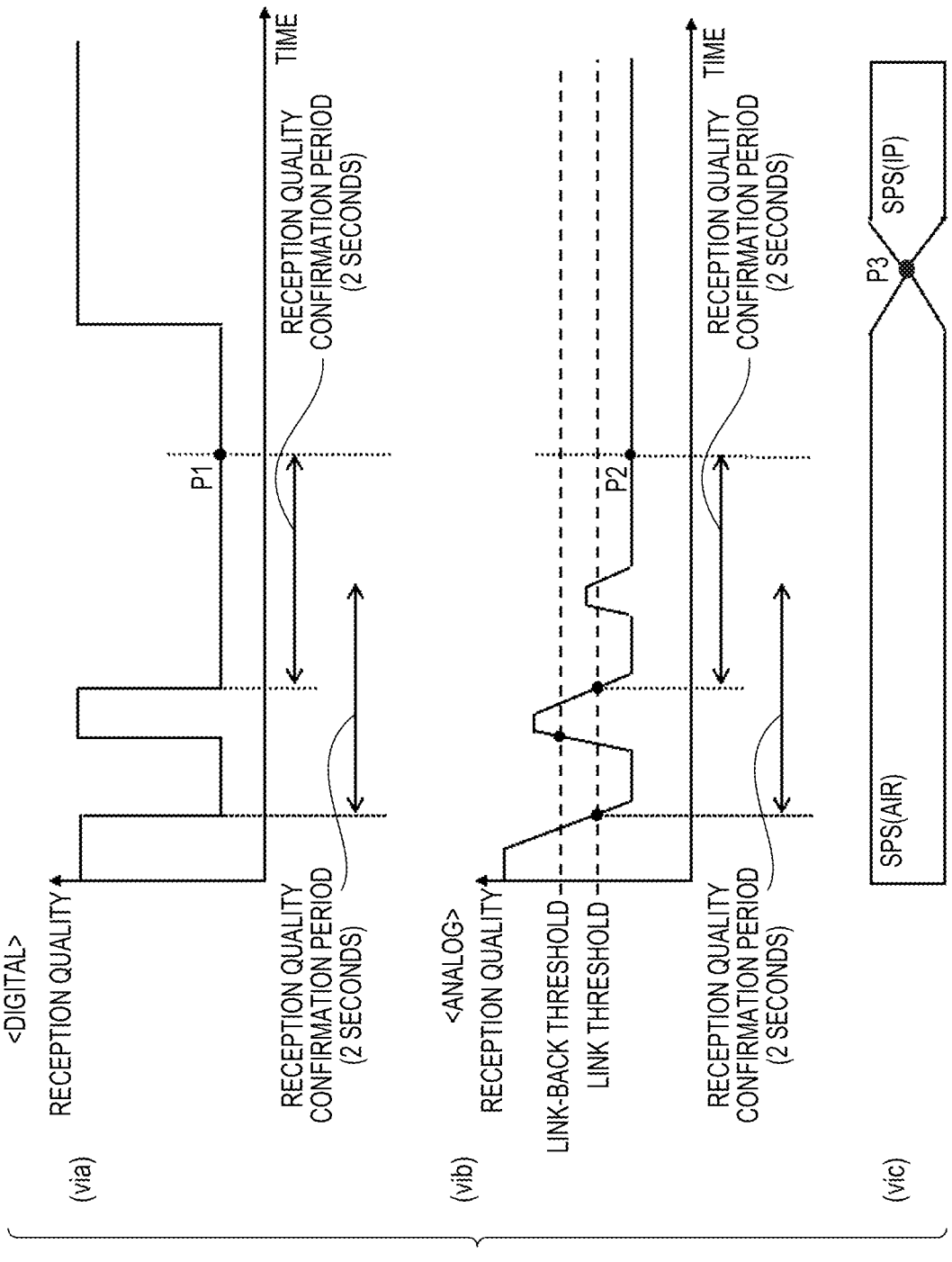
FIG. 6 is a conceptual diagram showing an example of determination performed by a switching determining unit when the radio broadcast receiver in FIG. 1 switches from the broadcast radio to the IP radio.

FIG. 6 is a conceptual diagram showing an example of determination performed by the switching determining unit 106 when the radio broadcast receiver 10 in FIG. 1 switches from the broadcast radio to the IP radio. FIG. 6 illustrates a graph (via) regarding the digital radio and a graph (vib) regarding the analog radio, with a horizontal axis representing time and a vertical axis representing a sound reception quality. FIG. 6 also illustrates a bar (vic) indicating whether the radio broadcast receiver 10 outputs the broadcast radio sound or the IP radio sound. A horizontal axis of the bar (vic) indicates time as in the graphs (via) and (vib).

The graph (via) regarding the digital radio corresponds to the digital quality information received from the digital radio decoder 102 by the switching determining unit 106 in the radio broadcast receiver 10 in FIG. 1. The graph (vib) regarding the analog radio corresponds to the analog quality information received from the analog radio decoder 103 by the switching determining unit 106 in the radio broadcast receiver 10 in FIG. 1. In the graphs (via) and (vib) in FIG.

6 and subsequent drawings, either the reception quality of the digital radio or the reception quality of the analog radio may rise first.

As shown in the graph (via), the reception quality of the digital radio takes two values, a high value and a low value. For example, if SPS broadcast can be received, the reception quality becomes the high value, and if the SPS broadcast cannot be received, the reception quality becomes the low value. In the radio broadcast receiver 10, if the radio source is switched to the IP radio immediately when the reception quality of the broadcast radio becomes low, switching between the broadcast radio and the IP radio is frequently performed, which is inconvenient, and thus, a time lag of a certain period of time is sometimes provided at the time of switching. For example, if the reception quality of the digital radio also does not become higher even though a certain period of time has passed since the reception quality of the digital radio became low, the switching determining unit 106 determines that switching from the broadcast radio to the IP radio is required to be performed. The certain period of time is, for example, 2 seconds. The time lag may be similarly provided for the analog radio. In FIG. 6, the time lag is described as a reception quality confirmation period. In the graph (via), the switching determining unit 106 determines that switching from the broadcast radio to the IP radio is required to be performed based on the reception quality of the digital radio at a time of a point P1.

However, if only the reception quality of a digital radio is used as a criterion for determining, as described above, the reception quality of the digital radio takes only two values, and a time lag is also present, and thus, it is desired to know the reception condition of the broadcast radio with higher accuracy. Therefore, in the embodiment of the present disclosure, the reception condition is determined by using the reception quality of the analog radio.

The reception quality of the analog radio indicated by the graph (vib) in FIG. 6 takes continuous values instead of the two values. Therefore, in the reception quality of the analog radio, a link threshold that serves as a reference for switching the radio source from the broadcast radio to the IP radio and a link-back threshold that serves as a reference for switching the radio source from the IP radio to the broadcast radio are set. Normally, the link-back threshold is set as a higher value than the link threshold. In the example shown in the drawing, when the reception quality of the analog radio continues to fall below the link-back threshold for a certain period of time after falling below the link threshold, that is, at a time of a point P2, the switching determining unit 106 determines that switching from the broadcast radio to the IP radio is required to be performed based on the reception quality of the analog radio.

It takes a certain amount of time from when the switching determining unit 106 determines that it is required to switch the broadcast radio to the IP radio until the IP radio sound is actually output from the speaker 108. Therefore, at a time of a point P3 after the point P1 or the point P2 in the bar (vic) in FIG. 6, the output sound is actually switched from the broadcast radio to the IP radio.

Figure 7:
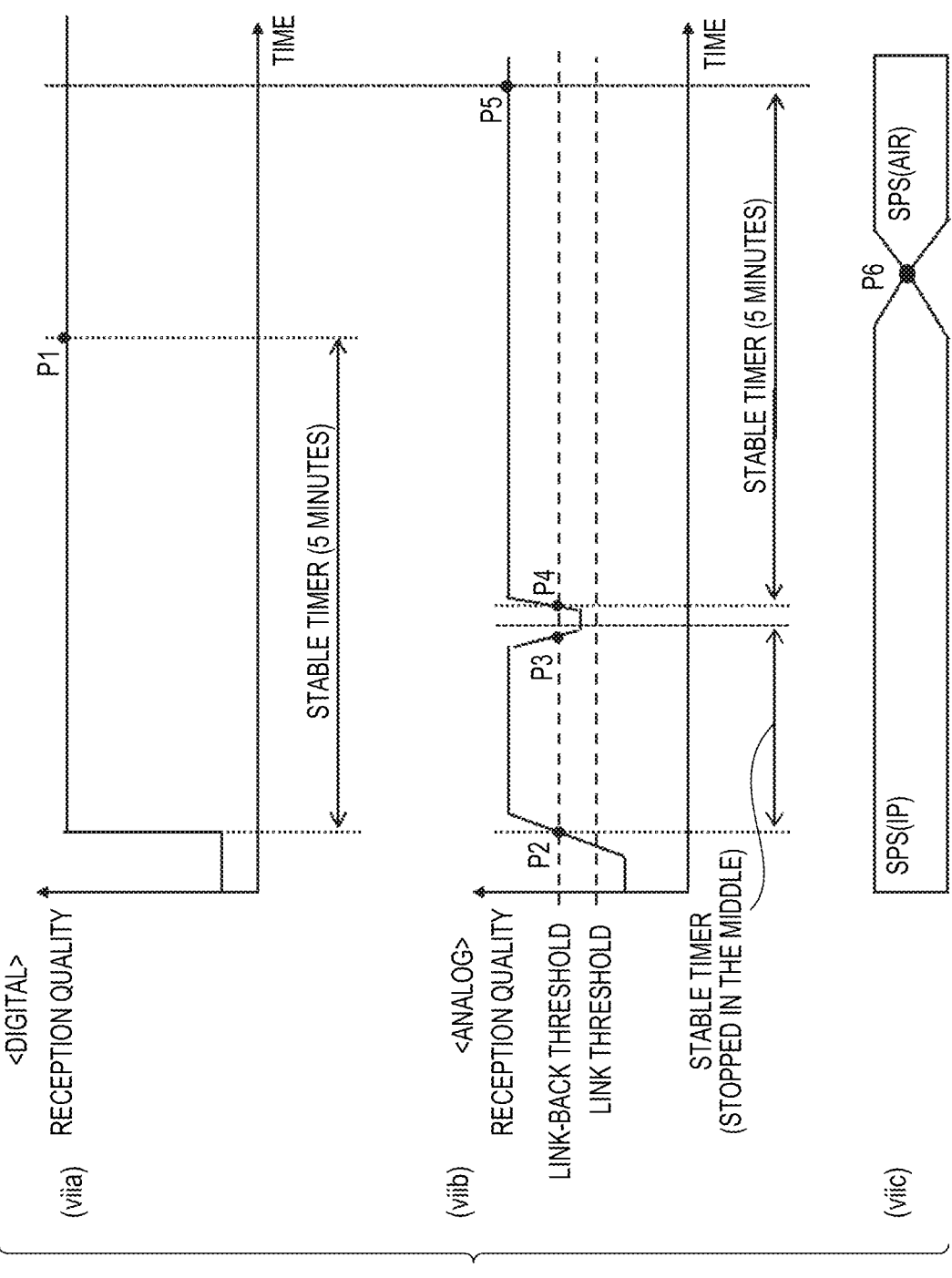
FIG. 7 is a conceptual diagram showing an example of determination performed by the switching determining unit when the radio broadcast receiver in FIG. 1 switches from the IP radio to the broadcast radio.

FIG. 7 is a conceptual diagram showing an example of the determination performed by the switching determining unit 106 when the radio broadcast receiver 10 in FIG. 1 switches the output sound from the IP radio to the broadcast radio. FIG. 7 illustrates a graph (viia) regarding the digital radio and a graph (viib) regarding the analog radio, with a horizontal axis representing time and a vertical axis representing a sound reception quality. FIG. 7 also illustrates a bar (viic) indicating whether the radio broadcast receiver 10 outputs the IP radio sound or the broadcast radio sound. A horizontal axis of the bar (viic) indicates time as in the graphs (viia) and (viib).

The graph (viia) regarding the digital radio corresponds to the digital quality information received from the digital radio decoder 102 by the switching determining unit 106 in the radio broadcast receiver 10 in FIG. 1. The graph (viib) regarding the analog radio corresponds to the analog quality information received from the analog radio decoder 103 by the switching determining unit 106 in the radio broadcast receiver 10 in FIG. 1.

Similar to the illustration in FIG. 6, as shown in the graph (viia), the reception quality of the digital radio takes two values, a high value and a low value. In the radio broadcast receiver 10, if the radio source is switched to the broadcast radio immediately when the reception quality of the broadcast radio becomes higher, switching may be performed before the reception quality of the broadcast radio stabilizes, which is inconvenient, and thus, a stable timer with a certain period of time may be provided as a waiting time when switching. For example, if the reception quality of the digital radio also does not become lower although a certain period of time has passed since the reception quality of the digital radio became higher, the switching determining unit 106 determines that switching from the IP radio to the broadcast radio is required to be performed because the broadcast radio stabilizes. The certain period of time is, for example, 5 minutes. The stable timer may be similarly provided for the analog radio. The stable timer can be set, for example, between 3 minutes and 20 minutes. A value of the stable timer may be a fixed value, or may be a value that can be changed by the user as appropriate.

If the switching determining unit 106 determines the switching of the radio source based only on the reception quality of the digital radio, as shown in the graph (viia), at the time of the point P1 when 5 minutes of the stable timer have elapsed since the reception quality became higher, the switching determining unit 106 determines that the radio source is required to be switched from the IP radio to the broadcast radio. It takes a certain amount of time from when the switching determining unit 106 determines that it is required to switch the IP radio to the broadcast radio until the broadcast radio sound is actually output from the speaker 108. Therefore, if the switching determining unit 106 determines the switching of the radio source based only on the reception quality of the digital radio, as shown in the bar (viic), at a time of P6, slightly later than the time of the point P1, the output sound is actually switched from the IP radio to the broadcast radio.

However, even if the reception quality of the digital radio indicated by the two values remains high, the reception quality of the analog radio, which takes continuous values, fluctuates in some cases, as shown in the graph (viib). Therefore, the switching determining unit 106 determines whether to switch the radio source from the IP radio to the broadcast radio based on not only the reception quality of the digital radio but also the reception quality of the analog radio.

The reception quality of the analog radio indicated by the graph (viib) in FIG. 7 takes continuous values instead of the two values. Therefore, in the reception quality of the analog radio, a link threshold that serves as a reference for switching the radio source from the broadcast radio to the IP radio and a link-back threshold that serves as a reference for switching the radio source from the IP radio to the broadcast radio are set. Normally, the link-back threshold is set as a higher value than the link threshold. In the example shown in the drawing, when the reception quality of the analog radio continues to exceed the link-back threshold for a certain period of time after exceeding the link-back threshold, that is, at a time of a point P5, the switching determining unit 106 determines that switching from the IP radio to the broadcast radio is required to be performed based on the reception quality of the analog radio. The certain period of time may be set as the stable timer. The certain period of time is, for example, 5 minutes.

Here, as described above with reference to FIG. 4, a case where it is possible to switch from the IP radio to the broadcast radio in step St202 means a case where the decoding of the digital radio in the broadcast radio can be continuously performed for a certain period of time, and the numerical value indicating the reception quality of the analog radio exceeds the first threshold α by the first time span. The certain period of time for the decoding of the digital radio corresponds, for example, to the stable timer in the graph (viia) of FIG. 7, that is, 5 minutes. The first threshold α corresponds to, for example, the link-back threshold in the graph (viib) of FIG. 7. The first time span corresponds, for example, to the stable timer for the graph (viib) of FIG. 7, that is, 5 minutes. That is, in step St202, the switching determining unit 106 determines that it is possible to switch the radio source from the IP radio to the broadcast radio at the time of the point P5. As a result, the sound output is actually switched from the IP radio to the broadcast radio at a time (not shown) slightly later than the time of the point P5.

Step St203 in FIG. 4 is the same as above. A case where it is possible to switch from the IP radio to the broadcast radio in step St203 means a case where the decoding of the digital radio in the broadcast radio can be continuously performed for a certain period of time, and the numerical value indicating the reception quality of the analog radio exceeds the second threshold β by the second time span. Since the second time span is shorter than the first time span, a value corresponding to the stable timer in the graph (viib) is set to be shorter than 5 minutes.

Here, an example of setting the stable timer is described. Measurement of the stable timer for the analog radio shown in the graph (viib) of FIG. 7 may be stopped when the reception quality of the analog radio falls below the link-back threshold for a predetermined period of time. The certain period of time is, for example, 10 seconds.

The example of setting the stable timer will be described in more detail by assuming that the certain period of time is, for example, 5 minutes and the predetermined time is, for example, 10 seconds. At the time of the point P2 in the graph (viib) of FIG. 7, the reception quality of the analog radio exceeds the link-back threshold. Therefore, at the time of the point P2, the measurement of the stable timer for the analog radio is started. However, at the time of the point P3, the reception quality of the analog radio falls below the link-back threshold. When 10 seconds have passed since the reception quality of the analog radio fell below the link-back threshold, the measurement of the stable timer for the analog radio is stopped. Then, at the time of the point P4, the reception quality of the analog radio exceeds the link-back threshold again. Therefore, at the time of the point P4, the measurement of the stable timer with 5 minutes for the analog radio is restarted.

Meanwhile, in a case of the digital radio shown in the graph (viia) of FIG. 7, a variable itself indicating the reception quality has hysteresis. Therefore, when the reception quality of the digital radio deteriorates even for a short period of time, the measurement of the stable timer for the digital radio is stopped.

Figure 8:
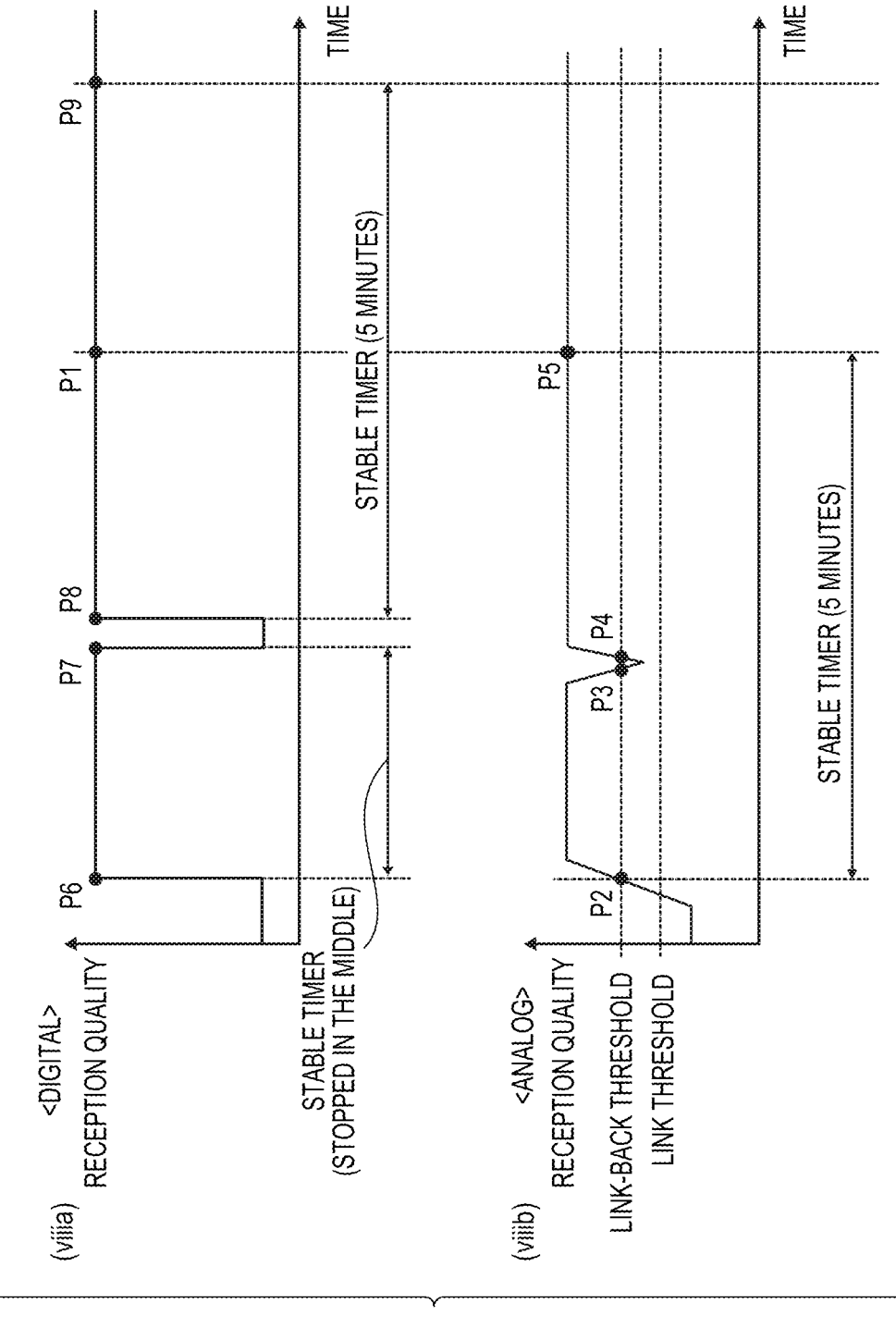
FIG. 8 is a conceptual diagram showing a situation where a stable timer for a digital radio is stopped.

FIG. 8 is a conceptual diagram showing a situation where the measurement of the stable timer for the digital radio is stopped. A vertical axis and a horizontal axis of a graph (viiia) in FIG. 8 are the same as the vertical axis and the horizontal axis of the graph (viia) in FIG. 7, and a vertical axis and a horizontal axis of a graph (viiib) in FIG. 8 are the same as the vertical axis and the horizontal axis of the graph (viib) in FIG. 7. First, referring to the graph (viiib) for the analog radio, the measurement of the stable timer for the analog radio starts at the point P2, and it is determined that the reception quality of the analog radio stabilizes at the point P5. Here, at the point P3, the reception quality of the analog radio falls below the link-back threshold. However, at the point P4, the reception quality of the analog radio exceeds the link-back threshold again. Since a time from the point P3 to the point P4 is less than the predetermined time of 10 seconds, the measurement of the stable timer for the analog radio at the time of the point P3 is not stopped.

Next, refer to the graph (viiia) regarding the digital radio. At the time of the point P6, the measurement of the stable timer for the digital radio begins. However, before a certain period of time of 5 minutes elapses, the reception quality of the digital radio deteriorates at a time of a point P7. Therefore, at the time of the point P7, the measurement of the stable timer for the digital radio is stopped. Since the reception quality of the digital radio becomes higher at a time of a point P8, the measurement of the stable timer for the digital radio is restarted at the time of the point P8. The certain period of time of 5 minutes has passed at a time of a point P9, and it is determined that the reception quality of the digital radio stabilizes.

In step St202 in FIG. 4, the switching determining unit 106 determines that it is possible to switch from the IP radio to the broadcast radio at the time of the point P9. As a result, the output sound is actually switched from the IP radio to the broadcast radio at a time (not shown) slightly later than the time of the point P9.

Figure 9:
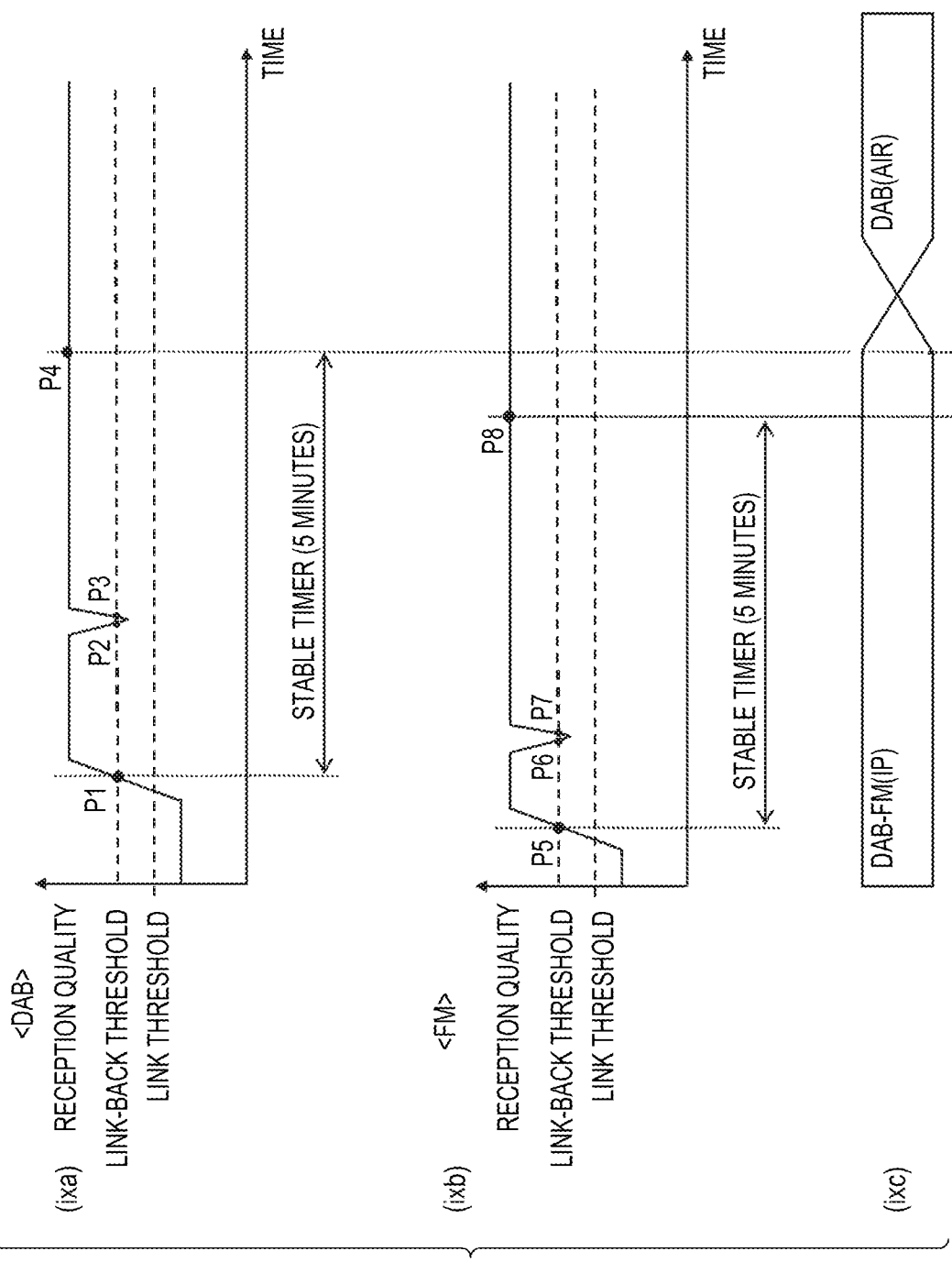
FIG. 9 is a conceptual diagram showing an example of determination performed by a switching determining unit when the radio broadcast receiver in FIG. 2 switches from the IP radio to DAB or FM.

FIG. 9 is a conceptual diagram showing an example of the determination performed by the switching determining unit 106 when the radio broadcast receiver 10B in FIG. 2 switches from the IP radio to DAB or FM. FIG. 9 illustrates a graph (ixa) regarding DAB and a graph (ixb) regarding FM with a horizontal axis representing time and a vertical axis representing a reception quality. FIG. 9 also illustrates a bar (ixc) indicating whether the radio broadcast receiver 10B outputs the IP radio sound or DAB or FM sound. A horizontal axis of the bar (ixc) indicates time as in the graphs (ixa) and (ixb).

The graph (ixa) regarding DAB corresponds to the digital quality information received from the digital radio decoder 102 by the switching determining unit 106 in the radio broadcast receiver 10B in FIG. 2. The graph (ixb) regarding FM corresponds to the analog quality information received from the analog radio decoder 103 by the switching determining unit 106 in the radio broadcast receiver 10B in FIG. 2.

As shown in the graphs (ixa) and (ixb), the reception quality takes continuous values for both DAB and FM. Therefore, a link threshold that serves as a reference for switching from DAB or FM to the IP radio and a link-back threshold that serves as a reference for switching from the IP radio to DAB or FM are set for each of the reception quality of DAB and the reception quality of FM. Normally, the link-back threshold is set as a higher value than the link threshold. In the example shown in the drawing, when the reception quality continues to exceed the link threshold for a certain period of time after exceeding the link-back threshold, the switching determining unit 106 determines that switching from the IP radio to DAB or FM is required to be performed. The certain period of time may be represented as the stable timer in FIG. 9. The certain period of time is, for example, 5 minutes. If the radio source is switched to DAB or FM immediately when the reception quality of DAB or FM becomes higher, the switching may be performed before the reception quality of DAB or FM stabilizes, which is inconvenient, and thus, the stable timer is set.

Measurement of the stable timers for DAB and FM may be stopped when the reception qualities fall below the link-back thresholds for a predetermined period of time, similarly to that described above based on the graph (viib) in FIG. 7. The certain period of time is, for example, 10 seconds.

If the switching determining unit 106 determines the switching of the radio source based only on the reception quality of DAB, as shown in the graph (ixa), at the time of the point P4 when 5 minutes of the stable timer have elapsed since the reception quality of DAB became higher at the time of the point P1, the switching determining unit 106 determines that the radio source can be switched from the IP radio to DAB. This corresponds to step St302 in FIG. 5. Here, at the time of the point P2, the reception quality of DAB falls below the link-back threshold. At the time of the point P3, the reception quality of DAB exceeds the link-back threshold again. Since a time from the point P2 to the point P3 is less than the predetermined time of 10 seconds, the measurement of the stable timer for DAB is not stopped at the time of the point P2.

As shown in the graph (ixb), at the time of the point P8 when 5 minutes of the stable timer have elapsed since the reception quality of FM became higher at the time of the point P5, the switching determining unit 106 determines that the radio source can be switched from the IP radio to FM. This corresponds to step St303 in FIG. 5. Here, at the time of the point P6, the reception quality of FM falls below the link-back threshold. At the time of the point P7, the reception quality of FM exceeds the link-back threshold again. Since a time from the point P6 to the point P7 is less than the predetermined time of 10 seconds, the measurement of the stable timer for FM is not stopped at the time of the point P6.

At the point P8, if the reception condition of DAB can be estimated to become good (step St304: YES), the switching determining unit 106 does not cause the switching unit 107 to switch the radio source from the IP radio to FM. Therefore, the IP radio continues to be output (step St306). Then, at the time point P4 when the reception condition of DAB actually becomes good, the switching determining unit 106 causes the switching unit 107 to switch the radio source from the IP radio to DAB (steps St302 and St305). In the example in FIG. 9, as shown in the graph (ixa), at the time of the point P8, the reception quality of DAB is maintained high for a certain amount of time after the reception quality of DAB exceeds the link-back threshold at the time of the point P1, and thus the switching determining unit 106 determines that the reception condition of DAB can be estimated to become good. The certain amount of time is, for example, half the time set as the stable timer. It takes a certain amount of time from when the switching determining unit 106 determines that the radio source is required to be switched from the IP radio to DAB or FM until DAB or FM sound is actually output from the speaker 108. Therefore, as shown in the bar (ixc), the switching determining unit 106 waits for a predetermined time from the time of the point P4, and then switches the radio source from the IP radio to DAB.

Meanwhile, at the time of the point P8, if the reception condition of DAB cannot be estimated to become good (step St304: NO), the switching determining unit 106 determines that the radio source is required to be switched from the IP radio to FM at the time of the point P8. The switching determining unit 106 waits for a predetermined time from the time of the point P8, and then switches the radio source from the IP radio to FM.

Figure 10:
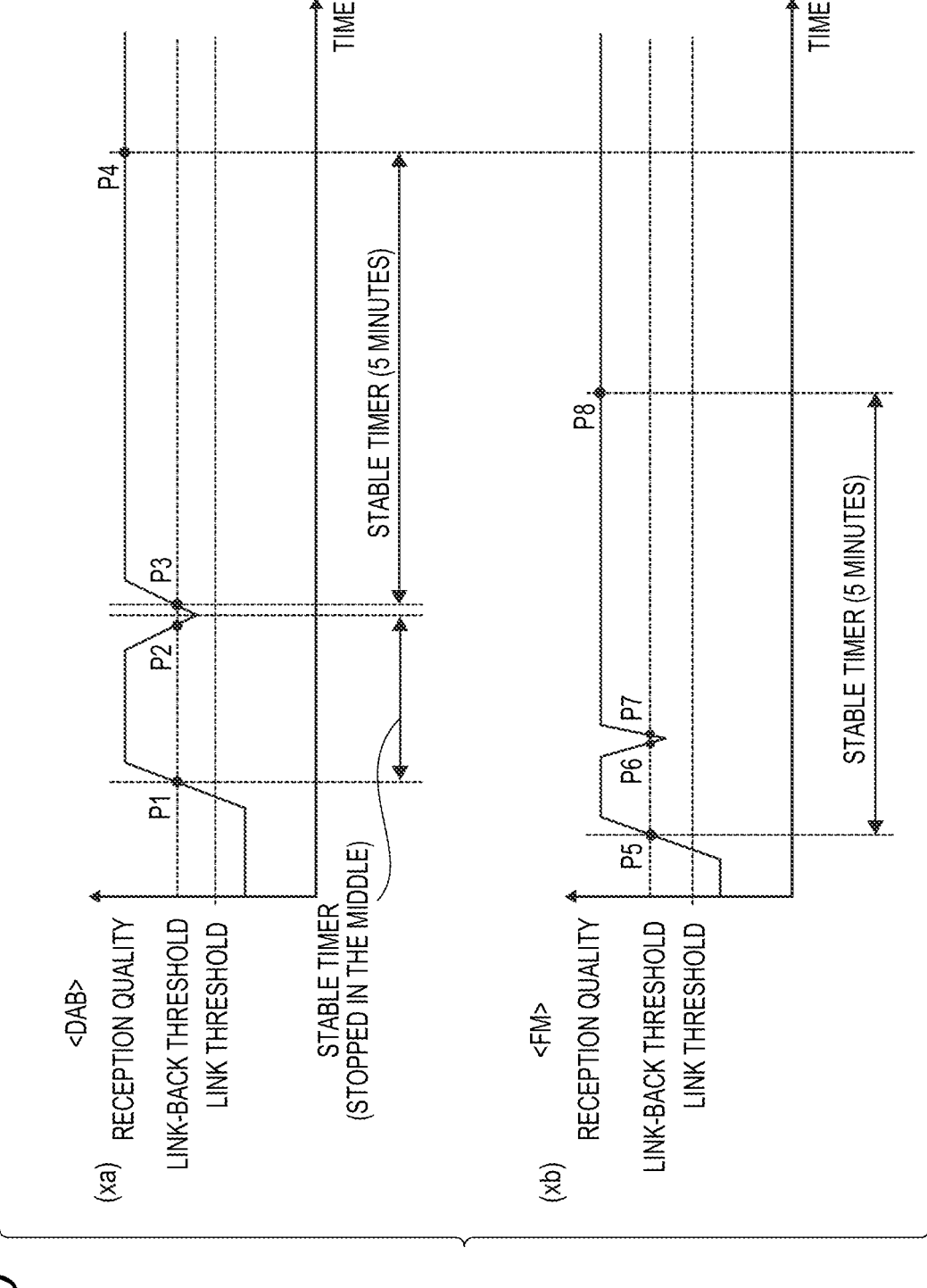
FIG. 10 is a conceptual diagram showing a situation where a stable timer for DAB is stopped.

FIG. 10 is a conceptual diagram showing a situation where the measurement of the stable timer for DAB is stopped. A vertical axis and a horizontal axis of a graph (xa) in FIG. 10 are the same as the vertical axis and the horizontal axis of graph (ixa) in FIG. 9, and a vertical axis and a horizontal axis of a graph (xb) in FIG. 10 are the same as the vertical axis and the horizontal axis of the graph (ixb) in FIG. 9. As can be seen in the graph (xa) regarding DAB, the reception quality of DAB falls below the link-back threshold from the time of the point P2. When the predetermined time of 10 seconds has elapsed from the time of the point P2, the measurement of the stable timer for DAB is stopped. Since the reception quality of DAB exceeds the link-back threshold from the time of the point P3, the measurement of the stable timer for DAB is started again at the time of the point P3.

Figure 11:
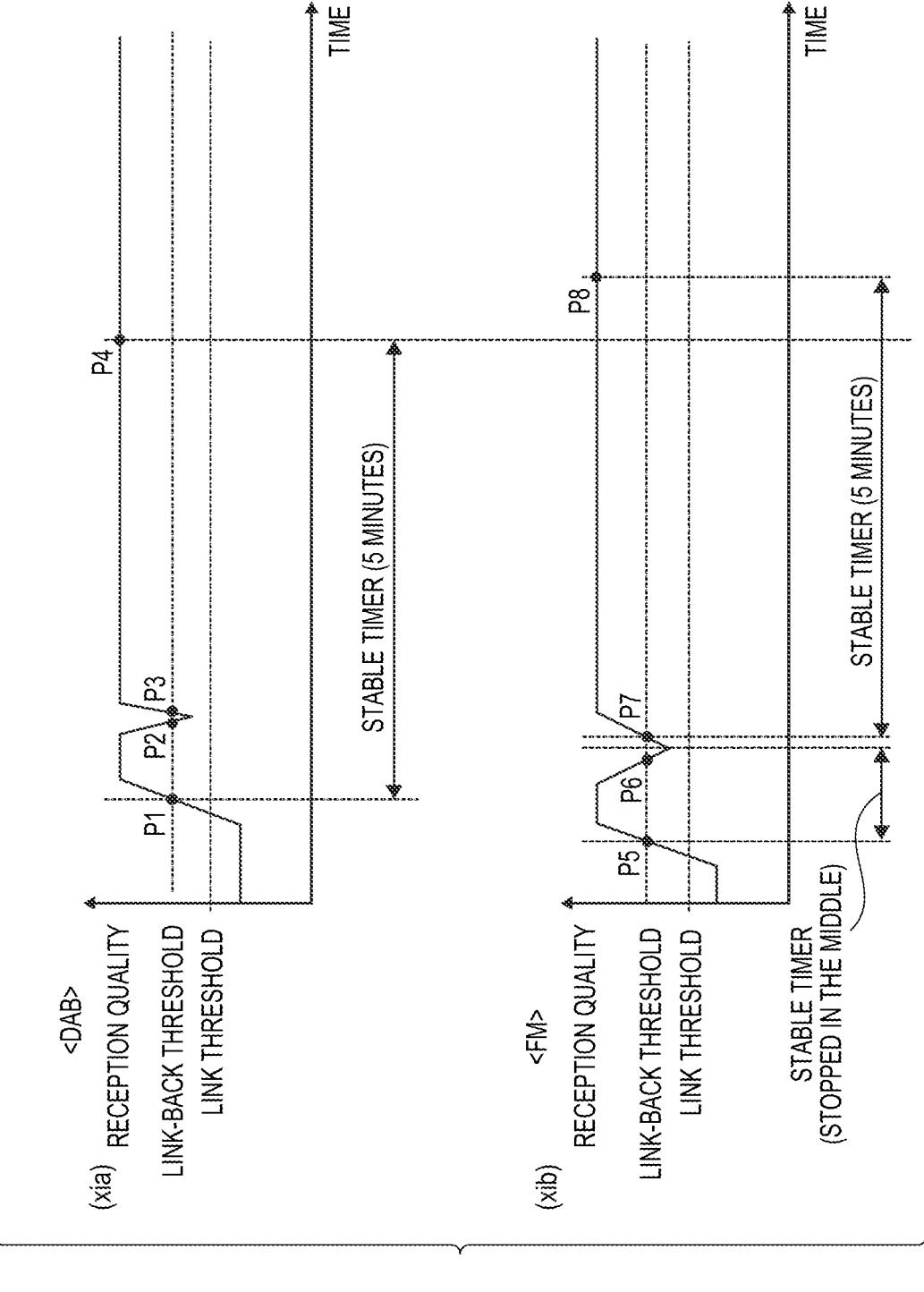
FIG. 11 is a conceptual diagram showing a situation where a stable timer for FM is stopped.

FIG. 11 is a conceptual diagram showing a situation where the measurement of the stable timer for FM is stopped. A vertical axis and a horizontal axis of a graph (xia) in FIG. 11 are the same as the vertical axis and the horizontal axis of graph (ixa) in FIG. 9, and a vertical axis and a horizontal axis of a graph (xib) in FIG. 11 are the same as the vertical axis and the horizontal axis of the graph (ixb) in FIG. 9. As can be seen in the graph (xib) regarding FM, the reception quality of FM falls below the link-back threshold from the time of the point P6. When the predetermined time of 10 seconds has elapsed since the time of the point P6, the measurement of the stable timer for FM is stopped. Since the reception quality of FM exceeds the link-back threshold from the time of the point P7, the stable timer for FM is started again at the time of the point P7.

Figure 12:
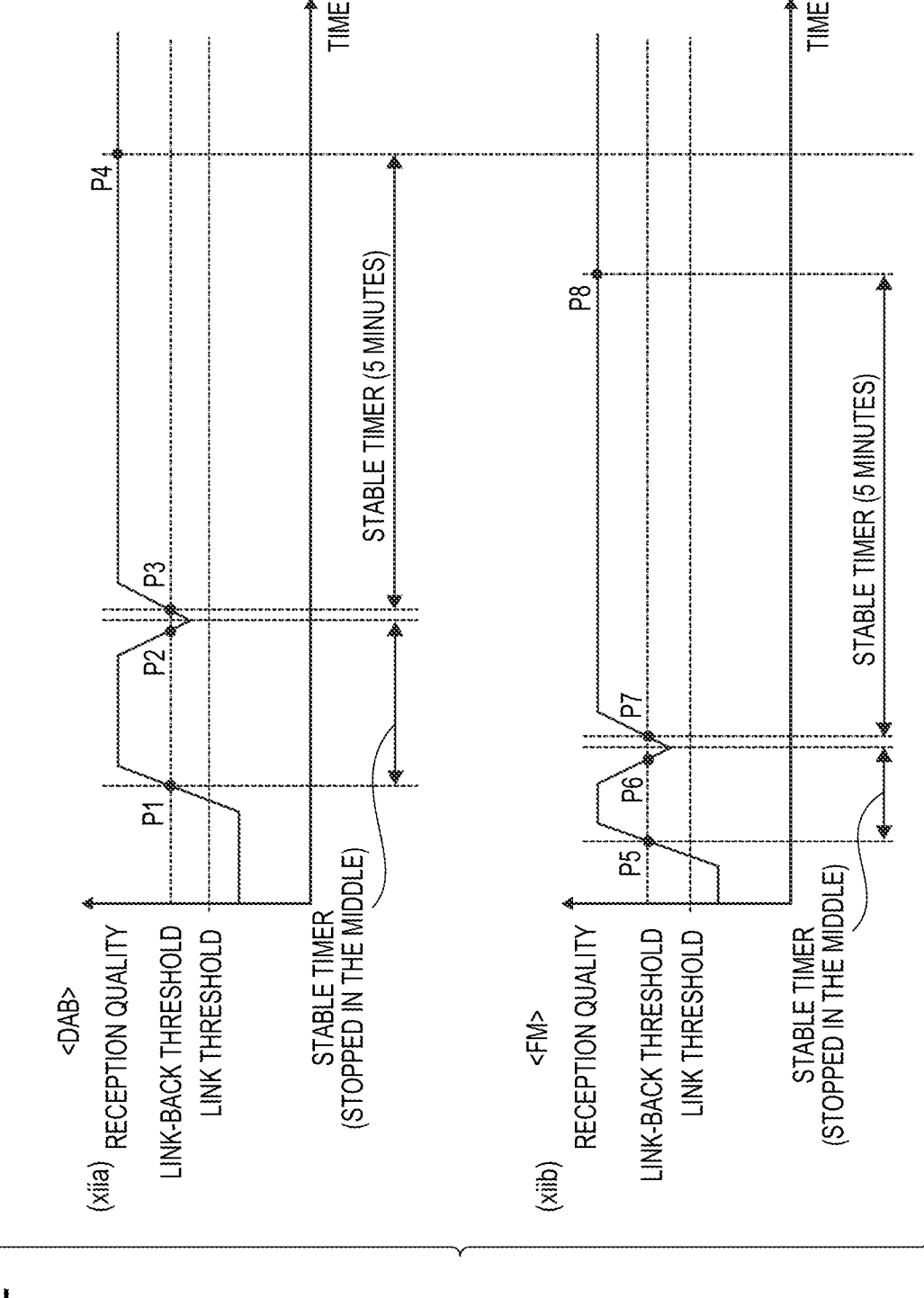
FIG. 12 is a conceptual diagram showing a situation where the stable timers for DAB and FM are stopped.

FIG. 12 is a conceptual diagram showing a situation where the stable timers for DAB and FM are stopped. A vertical axis and a horizontal axis of a graph (xiia) in FIG. 12 are the same as the vertical axis and the horizontal axis of graph (ixa) in FIG. 9, and a vertical axis and a horizontal axis of a graph (xiib) in FIG. 12 are the same as the vertical axis and the horizontal axis of the graph (ixb) in FIG. 9. As can be seen in the graph (xiia) regarding DAB, the reception quality of DAB falls below the link-back threshold from the time of the point P2. When the predetermined time of 10 seconds has elapsed from the time of the point P2, the measurement of the stable timer for DAB is stopped. Since the reception quality of DAB exceeds the link-back threshold from the time of the point P3, the measurement of the stable timer for DAB is started again at the time of the point P3. As can be seen in the graph (xiib) regarding FM, the reception quality of FM falls below the link-back threshold from the time of the point P6. When the predetermined time of 10 seconds has elapsed since the time of the point P6, the measurement of the stable timer for FM is stopped. Since the reception quality of FM exceeds the link-back threshold from the time of the point P7, the measurement of the stable timer for FM is started again at the time of the point P7.

In FIGS. 10 and 12, a timing at which the switching determining unit 106 determines that the radio source is required to be switched from the IP radio to DAB or FM is the same as the timing described above with reference to FIG. 9.

In FIG. 11, the time of the point P8 is later than the time of the point P4. The stable timer for DAB, which is 5 minutes has elapsed at the time of the point P4. Therefore, if the switching determining unit 106 determines the switching of the radio source based only on the reception quality of DAB, at the time of the point P4, the radio source is switched from the IP radio to DAB (see steps St302 and St305 in FIG. 5). However, if the switching determining unit 106 uses both the reception quality of DAB and the reception quality of FM to determine the switching of the radio source, at the time of the point P8, the radio source is switched from the IP radio to, for example, DAB.

(Summary of the Present Disclosure)

The contents of the present disclosure can be expressed as in the following supplementary notes.

<Supplementary Note 1>

A radio broadcast receiver includes an antenna configured to receive a broadcast radio; an antenna configured to receive an IP radio; and a switching determining unit configured to determine switching of a radio source from one of the broadcast radio and the IP radio to the other of the broadcast radio and the IP radio. The broadcast radio includes a digital radio and an analog radio. The switching determining unit performs determination of the switching based on analog quality information indicating a reception quality of the analog radio. Accordingly, the radio broadcast receiver can switch the radio source between the broadcast radio and the IP radio with high accuracy.

<Supplementary Note 2>

In Supplementary Note 1, the radio broadcast receiver includes a switching unit configured to switch the radio source from one of the broadcast radio and the IP radio to the other of the broadcast radio and the IP radio. In a case of determining that a reception condition of the analog radio is good based on the analog quality information, the switching determining unit causes the switching unit to switch the radio source from the IP radio to the broadcast radio. Accordingly, the radio broadcast receiver can switch the radio source from the IP radio to the broadcast radio in a case in which the reception condition of the analog radio is good.

<Supplementary Note 3>

In Supplementary Note 1, the radio broadcast receiver includes a switching unit configured to switch the radio source from one of the broadcast radio and the IP radio to the other of the broadcast radio and the IP radio. In a case of determining that a reception condition of the analog radio is good based on the analog quality information, the switching determining unit causes the switching unit to switch the radio source from the IP radio to the digital radio. Accordingly, the radio broadcast receiver can switch the radio source from the IP radio to the digital radio in a case in which the reception condition of the analog radio is good.

<Supplementary Note 4>

In Supplementary Note 2, in a case of determining that the reception condition of the analog radio is good based on the analog quality information, the switching determining unit causes the switching unit to switch the radio source from the IP radio to the digital radio. Accordingly, the radio broadcast receiver can switch the radio source from the IP radio to the digital radio in a case in which the reception condition of the analog radio is good.

<Supplementary Note 5>

In Supplementary Note 1, the radio broadcast receiver includes a switching unit configured to switch the radio source from one of the broadcast radio and the IP radio to the other of the broadcast radio and the IP radio. In a case of determining that a reception condition of the analog radio is not good based on the analog quality information, the switching determining unit causes the switching unit to switch the radio source from the broadcast radio to the IP radio. Accordingly, the radio broadcast receiver can switch the radio source from the broadcast radio to the IP radio in a case in which the reception condition of the analog radio is not good.

<Supplementary Note 6>

In Supplementary Note 2 or Supplementary Note 4, in a case of determining that the reception condition of the analog radio is not good based on the analog quality information, the switching determining unit causes the switching unit to switch the radio source from the broadcast radio to the IP radio. Accordingly, the radio broadcast receiver can switch the radio source from the broadcast radio to the IP radio in a case in which the reception condition of the analog radio is not good.

<Supplementary Note 7>

In Supplementary Note 1, the radio broadcast receiver includes a switching unit configured to switch the radio source from one of the broadcast radio and the IP radio to the other of the broadcast radio and the IP radio. In a case of determining that a reception condition of the analog radio is not good based on the analog quality information while the digital radio of the broadcast radio is selected as the radio source, the switching determining unit causes the switching unit to switch the radio source from the digital radio to the IP radio. Accordingly, the radio broadcast receiver can switch the radio source from the digital radio to the IP radio in a case in which the digital radio is selected as the radio source and the reception condition of the analog radio is not good.

<Supplementary Note 8>

In any one of Supplementary Note 2, Supplementary Note 4, and Supplementary Note 6, in a case of determining that the reception condition of the analog radio is not good based on the analog quality information while the digital radio of the broadcast radio is selected as the radio source, the switching determining unit causes the switching unit to switch the radio source from the digital radio to the IP radio. Accordingly, the radio broadcast receiver can switch the radio source from the digital radio to the IP radio in a case in which the digital radio is selected as the radio source and the reception condition of the analog radio is not good.

<Supplementary Note 9>

In Supplementary Note 1, the switching determining unit is configured to determine the switching based on digital quality information indicating a reception quality of the digital radio and the analog quality information. Accordingly, the radio broadcast receiver can determine to switch the radio source based on the digital quality information in addition to the analog quality information.

<Supplementary Note 10>

In Supplementary Note 9, the radio broadcast receiver includes a switching unit configured to switch the radio source from one of the broadcast radio and the IP radio to the other of the broadcast radio and the IP radio. In a case of determining that a reception condition of the digital radio is not good based on the digital quality information; or in a case of determining that the reception condition of the digital radio is good but a reception condition of the analog radio is not good based on the analog quality information and the digital quality information, the switching determining unit causes the switching unit to switch the radio source from the broadcast radio to the IP radio. Accordingly, the radio broadcast receiver can switch the radio source from the broadcast radio to the IP radio in a case in which the reception condition of the digital radio is not good, or the reception condition of the digital radio is good, but the reception condition of the analog radio is not good.

<Supplementary Note 11>

In Supplementary Note 9, the radio broadcast receiver includes a switching unit configured to switch the radio source from one of the broadcast radio and the IP radio to the other of the broadcast radio and the IP radio. In a case of determining that both a reception condition of the digital radio and a reception condition of the analog radio are good based on the analog quality information and the digital quality information, the switching determining unit causes the switching unit to switch the radio source from the IP radio to the broadcast radio. Accordingly, the radio broadcast receiver can switch the radio source from the IP radio to the broadcast radio in a case in which both the reception condition of the digital radio and the reception condition of the analog radio are good.

<Supplementary Note 12>

In Supplementary Note 10, in a case of determining that both the reception condition of the digital radio and the reception condition of the analog radio are good based on the analog quality information and the digital quality information, the switching determining unit causes the switching unit to switch the radio source from the IP radio to the broadcast radio. Accordingly, the radio broadcast receiver can switch the radio source from the IP radio to the broadcast radio in a case in which both the reception condition of the digital radio and the reception condition of the analog radio are good.

<Supplementary Note 13>

In Supplementary Note 9, the radio broadcast receiver includes a switching unit configured to switch the radio source from one of the broadcast radio and the IP radio to the other of the broadcast radio and the IP radio. In a case of determining that a reception condition of the digital radio is good based on the digital quality information, the switching determining unit causes the switching unit to switch the radio source from the IP radio to the digital radio. In a case of determining that the reception condition of the digital radio is not good and a reception condition of the analog radio is good based on the analog quality information and the digital quality information, the switching determining unit causes the switching unit to switch the radio source from the IP radio to the analog radio. Accordingly, the radio broadcast receiver can switch the radio source from the IP radio to the digital radio in a case in which the reception condition of the digital radio is good, and can switch the radio source from the IP radio to the analog radio in a case in which the reception condition of the digital radio is not good and the reception condition of the analog radio is good.

<Supplementary Note 14>

In Supplementary Note 9, the radio broadcast receiver includes a switching unit configured to switch the radio source from one of the broadcast radio and the IP radio to the other of the broadcast radio and the IP radio. The switching determining unit causes the radio source to be switched from the IP radio to the digital radio in a case of determining that a reception condition of the digital radio is good based on the digital quality information. The switching determining unit causes the radio source to be switched from the IP radio to the analog radio in a case in which: a reception condition of the digital radio is determined not to be good and a reception condition of the analog radio is determined to be good based on the analog quality information and the digital quality information; and the reception condition of the digital radio is not estimated to become good. Accordingly, the radio broadcast receiver can switch the radio source from the IP radio to the digital radio in a case in which the reception condition of the digital radio is good, and can switch the radio source from the IP radio to the analog radio in a case in which: (i) the reception condition of the digital radio is not good; (ii) the reception condition of the analog radio is good; and (iii) the reception condition of the digital radio is not estimated to become good.

<Supplementary Note 15>

In Supplementary Note 14, the switching determining unit causes the radio source to be switched from the IP radio to the broadcast radio after waiting for a predetermined time in a case in which: the reception condition of the digital radio is determined not to be good and the reception condition of the analog radio is determined to be good based on the analog quality information and the digital quality information; and the reception condition of the digital radio is estimated to become good. Accordingly, the radio broadcast receiver can wait for the predetermined time and switch the radio source from the IP radio to the broadcast radio after the reception condition of the digital radio becomes good in a case in which: (i) the reception condition of the digital radio is not good; (ii) the reception condition of the analog radio is good; and (iii) the reception condition of the digital radio is estimated to become good.

<Supplementary Note 16>

A radio source switching method includes a step of receiving information indicating a reception quality of a digital radio; a step of receiving information indicating a reception quality of an analog radio; a step of determining switching of a radio source from one of a broadcast radio and an IP radio to the other of the broadcast radio and the IP radio based on the information indicating the reception quality of the digital radio and the information indicating the reception quality of the analog radio. The broadcast radio includes the digital radio and the analog radio. Accordingly, in the radio source switching method, the radio source can be switched between the broadcast radio and the IP radio with high accuracy.

Although the radio broadcast receiver and the radio source switching method according to the present disclosure have been described with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the various embodiments described above may be combined optionally in a range without deviating from the spirit of the invention.

The present application is based on a Japanese Patent Application (Japanese Patent Application No. 2021-030901) filed on Feb. 26, 2021, and the contents thereof are incorporated in the present application by reference.

The present disclosure is useful as a radio source switching method and a radio broadcast receiver capable of switching a radio source between an IP radio and a broadcast radio with high accuracy.

The invention claimed is:
1. A radio broadcast receiver comprising:
a memory;

a processor that is coupled to the memory, and, when executing a program stored in the memory, performs operations comprising:

receiving analog quality information indicating a reception quality of an analog radio based on a broadcast radio including a digital radio and the analog radio;

determining switching of a radio source from a first one of the broadcast radio and an Internet Protocol (IP) radio to a second one of the broadcast radio and the IP radio based on the analog quality information indicating the reception quality of the analog radio;

switching the radio source from the IP radio to the broadcast radio in a case in which a reception condition of the analog radio is determined to be good based on the analog quality information;

switching the radio source from the IP radio to the digital radio in a case in which the reception condition of the analog radio is determined to be good based on the analog quality information while the IP radio is selected as the radio source; and switching the radio source from the digital radio to the IP radio in a case in which the reception condition of the analog radio is determined not to be good based on the analog quality information while the digital radio of the broadcast radio is selected as the radio source; and a speaker that, in operation, outputs a broadcast radio sound or an IP radio sound according to the switching, wherein the processor, in operation, determines the reception condition of the analog radio is good when a numerical value of a signal level of the analog radio continues to exceed a first threshold value for a first period of time, and wherein the processor, in operation, determines the reception condition of the analog radio is not good when the numerical value of the signal level of the analog radio continues to fall below a second threshold value for a second period of time, the second threshold value being lower than the first threshold value.

2. The radio broadcast receiver according to claim 1, wherein the operations further comprise:

switching the radio source from the broadcast radio to the IP radio in a case in which the reception condition of the analog radio is determined not to be good based on the analog quality information.

3. The radio broadcast receiver according to claim 1, wherein the operations further comprise:

receiving digital quality information indicating a reception quality of the digital radio; and determining the switching based on the digital quality information and the analog quality information.

4. The radio broadcast receiver according to claim 3, wherein the operations further comprise:

switching the radio source from the broadcast radio to the IP radio in a case in which a reception condition of the digital radio is determined not to be good based on the digital quality information or in a case in which the reception condition of the digital radio is determined to be good but a reception condition of the analog radio is determined not to be good based on the analog quality information and the digital quality information.

5. The radio broadcast receiver according to claim 3, wherein the operations further comprise:

switching the radio source from the IP radio to the broadcast radio in a case in which both a reception condition of the digital radio and a reception condition of the analog radio are determined to be good based on the analog quality information and the digital quality information.

6. The radio broadcast receiver according to claim 4, wherein the operations further comprise:

switching the radio source from the IP radio to the broadcast radio in a case in which both the reception condition of the digital radio and the reception condition of the analog radio are determined to be good based on the analog quality information and the digital quality information.

7. The radio broadcast receiver according to claim 3, wherein the operations further comprise:

switching the radio source from the IP radio to the digital radio in a case in which a reception condition of the digital radio is determined to be good based on the digital quality information; and switching the radio source from the IP radio to the analog radio in a case in which the reception condition of the digital radio is determined not to be good and a reception condition of the analog radio is determined to be good based on the analog quality information and the digital quality information.

8. The radio broadcast receiver according to claim 3, wherein the operations further comprise:

switching the radio source from the IP radio to the digital radio in a case in which a reception condition of the digital radio is determined to be good based on the digital quality information; and switching the radio source from the IP radio to the analog radio in a case in which:

(i) the reception condition of the digital radio is determined not to be good based on the digital quality information;

(ii) the reception condition of the analog radio is determined to be good based on the analog quality information; and (iii) the reception condition of the digital radio is not estimated to become good.

9. The radio broadcast receiver according to claim 8, wherein the operations further comprise:

switching the radio source from the IP radio to the broadcast radio after waiting for a predetermined time in a case in which:

(i) the reception condition of the digital radio is determined not to be good based on the digital quality information;

(ii) the reception condition of the analog radio is determined to be good based on the analog quality information; and (iii) the reception condition of the digital radio is estimated to become good.

10. The radio broadcast receiver according to claim 1, further comprising:

a first antenna; and a second antenna different from the first antenna, wherein a radio wave of the broadcast radio is received by the first antenna, and a radio wave of the IP radio is received by the second antenna.

11. A radio source switching method comprising:

receiving analog quality information indicating a reception quality of an analog radio based on a broadcast radio including a digital radio and the analog radio;

determining switching of a radio source from a first one of the broadcast radio and an Internet Protocol (IP) radio to a second one of the broadcast radio and the IP radio based on the analog quality information indicating the reception quality of the analog radio;

switching the radio source from the IP radio to the broadcast radio in a case in which a reception condition of the analog radio is determined to be good based on the analog quality information;

switching the radio source from the IP radio to the digital radio in a case in which the reception condition of the analog radio is determined to be good based on the analog quality information while the IP radio is selected as the radio source; and switching the radio source from the digital radio to the IP radio in a case in which the reception condition of the analog radio is determined not to be good based on the analog quality information while the digital radio of the broadcast radio is selected as the radio source; and outputting a broadcast radio sound or an IP radio sound from a speaker according to the switching wherein the reception condition of the analog radio is determined to be good when a numerical value of a signal level of the analog radio continues to exceed a first threshold value for a first period of time, and wherein the reception condition of the analog radio is determined not to be good when the numerical value of the signal level of the analog radio continues to fall below a second threshold value for a second period of time, the second threshold value being lower than the first threshold value.

12. The radio broadcast receiver according to claim 1, wherein when sound interruptions are greater than or equal to a predetermined threshold in the IP radio, the speaker switches from outputting the IP radio sound having the sound interruptions, the broadcast radio sound of which the reception condition of the analog radio is determined to be good.

* * * * *